(12) United States Patent
Pishva

(10) Patent No.: US 7,555,159 B2
(45) Date of Patent: Jun. 30, 2009

(54) IMAGE HIGHLIGHT CORRECTION USING ILLUMINATION SPECIFIC HSV COLOR COORDINATE

(76) Inventor: Davar Pishva, 688-339 Miyagawa, Gamo-cho, Gamo-gun, Shiga-ken (JP) 529-1551

( * ) Notice: Subject to any disclaimer, the term of this patent is extended or adjusted under 35 U.S.C. 154(b) by 0 days.

(21) Appl. No.: 10/484,793

(22) PCT Filed: Nov. 7, 2001

(86) PCT No.: PCT/JP01/09796

§ 371 (c)(1), (2), (4) Date: Jan. 22, 2004

(87) PCT Pub. No.: WO03/041012

PCT Pub. Date: May 15, 2003

(65) Prior Publication Data

US 2004/0208359 A1    Oct. 21, 2004

(51) Int. Cl.
*G06K 9/00* (2006.01)

(52) U.S. Cl. .................... 382/162; 382/167
(58) Field of Classification Search .......... 382/162, 382/163, 167, 274
See application file for complete search history.

(56) References Cited

U.S. PATENT DOCUMENTS 5,384,901 A * 1/1995 Glassner et al. ............ 345/591
6,628,825 B1 * 9/2003 Yamazoe et al. ............ 382/167

* cited by examiner

*Primary Examiner*—Phuoc Tran

(57) ABSTRACT

An image highlight correction method comprising the steps of mapping the image data from RGB color coordinates to an illumination specific HSV color coordinate system the value axis of which is in the direction of the light source, estimating highlight free HSV coordinates for each pixel, and restoring a highlight free image in RGB representation. Image highlight correction programs and image acquisition systems that make use of this image highlight correction method are also disclosed.

50 Claims, 9 Drawing Sheets

IMAGE HIGHLIGHT CORRECTION USING ILLUMINATION SPECIFIC HSV COLOR COORDINATE

TECHNICAL FIELD

This invention concerns a method for estimating the underlying colors of image highlights in machine vision applications. Most machine vision applications involve analysis of images resulting from the reflectance of light. Object surface color is one of the most important pieces of information for computer vision. Colors recorded as images, however, do not specify the true colors of an object's surface. They also contain specular or interface reflectance, which appears as highlight or gloss on the object. In some cases, the highlight may be so strong that an imaging device's detecting elements, which capture the highlighted parts, become saturated.

BACKGROUND ART

When we look at reflected light L of a dielectric material, such as plastic, we usually see two distinct reflection components: a specular or interface reflection component $L_s$ and a diffuse or body reflection component $L_b$. The specular or interface reflection occurs at the surface and in only one direction, such that the incident light beam, the surface normal, and the reflected beam are coplanar, and the angles of the incident and reflected light with respect to the surface normal are equal. In general, $L_s$ has approximately the same power distribution as the illumination and appears as a highlight or gloss on the object. Hence, it is also referred to as illuminant color.

As shown in FIG. 1, not all of the incident light is reflected at the surface and some penetrate into the material. The refracted light beam travels through the medium, hitting pigments from time to time. Within the material, the light rays get reflected and refracted repeatedly at boundaries that have different refractive indices. Some of the scattered light ultimately find their way back to the surface and exit from the material in various directions, forming a diffuse or body reflection component $L_b$. This component carries object color information and is also referred to as object or body color.

The dichromatic reflectance model (DRM) assumes that the reflected light L from a dielectric object surface such as plastic, paint, paper, and ceramic is a mixture of the specular reflection component $L_s$ and the body reflection component $L_b$. Mathematically, the model can be formulated as:

$$L(\lambda,\phi,\psi,\theta)=L_s(\lambda,\phi,\psi,\theta)+L_b(\lambda,\phi,\psi,\theta), \text{ or simply,}$$

$$L(\lambda,\phi,\psi,\theta)=m_s(\phi,\psi,\theta)C_s(\lambda)+m_b(\phi,\psi,\theta)C_b(\lambda) \qquad \text{Eq. (1)}$$

where $\lambda$ is the wavelength, and the parameters $\phi$, $\psi$, $\theta$ describe angles of the incident and emitted light and the phase angle. The terms, $m_s$ and $m_b$, are the geometric scale factors, while $C_s(\lambda)$ and $C_b(\lambda)$ are the specular color and body color vectors, respectively.

If the description of the scene radiance is restricted to the three narrow wavelength bands of the red, green and blue spectra range of visible light, as it is the case in a TV camera, then the scene radiance can be represented as a 3×1 color vector:

$$C(x,y)=m_s(\phi,\psi,\theta)C_s+m_b(\phi,\psi,\theta)C_b(x,y) \qquad \text{Eq. (2)}$$

where (x, y) specifies a pixel position and C(x, y) is the observed color vector. As can be observed in FIG. 2, this equation implies that the observed color C(x, y) is distributed on a plane which is spanned by the two vectors $C_s$ and $C_b(x, y)$. The term $C_s$ does not depend on the pixel position since it represents a single illuminant color. Thus if the vectors $C_s$ and $C_b(x, y)$ can be estimated, the specular reflectance can be distinguished from the diffuse reflectance, thereby enabling the diffuse reflectance, in other words the true color, to be obtained.

In prior arts, the above estimation is carried out by a multiple illumination method (N. Nayar, K. Ikeuchi and T. Kanade, "Determining Shape and Reflectance of Hybrid Surfaces by Photometric Sampling", IEEE Trans. on Robotics and Automation, Vol. 6, No. 4, pp. 418-431 (1990)), or by a multiple image method (M. Otsuki, Y. Sato, "Highlight Separation Using Multiple Images with Intensities and Ranges", MVA '96, IAPR Workshop on Machine Vision Application, pp. 293-296 (1996)). In the multiple illumination method, a plurality of illumination sources are used while viewing the image from the same point, in other words, the $C_S$ component is varied to estimate the $C_b$ component and solve equation (2) to obtain the true object color. In the multiple image method, the same effect is achieved using a single fixed light source and observing the image of the object from several different orientations.

The prior arts employ DRM and attempt to estimate the object color using the patterns of reflectance color distribution that pixels of various regions of an image form in color space. However, the approach is not effective for correct estimation of object colors when an analyzed region of the image consists of several different color clusters, as in the case of an image of an object with fine or intricate color variations. Furthermore, both of the above methods require specialized apparatus (i.e. multiple light sources or a device enabling the capturing of images from different orientations) and setup environment and take long processing times. These methods therefore cannot be applied flexibly to objects under all environments and do not adequately answer the high-speed requirements of machine vision applications.

DISCLOSURE OF INVENTION

An object of this invention is therefore to provide a fast highlight correction method that can be implemented in a single illumination and single image setup, which does not require specialized apparatus or setup environment. Another object of this invention is to enable, for at least the unsaturated or valid pixels of the image of an object, the determination of the true color of each pixel independently of the other pixels to thereby enable the true colors of an object, having fine or intricate color variations, to be estimated readily. Yet another object of this invention is to introduce a new multiple illumination, multiple view, or combined multiple illumination and multiple view method as an alternative means for more accurate estimation of the object colors of the strongly highlighted parts, which completely saturate the imaging device's detecting elements that capture the highlighted segments.

In order to achieve the above objects, this invention proposes an illumination specific HSV color coordinate system, the intensity axis of which lies in the direction of the light source and which provides an image highlight correction method comprising the steps of mapping the image data from RGB color coordinates to the abovementioned illumination specific HSV color coordinates, estimating highlight free HSV coordinates for each pixel, and restoring a highlight free image in RGB representation.

In estimating the true object color, this method divides the image data into a group of valid pixels, for which the imaging device's detecting elements have not been saturated (e.g., on which the DRM can be used), and a group of non-valid pixels, for which the imaging device's detecting elements have been saturated. Accurate object colors of the valid pixel group are estimated by projecting the pixels along the light source vector onto the S-H plane of the illumination specific HSV color coordinate system and determining highlight free HSV color coordinates for the pixels. The approach enables true object color estimation of each pixel independent of other pixels, thus allowing the true colors of an object having fine or intricate variations of color to be estimated readily. The true RGB color coordinates of each non-valid pixel is estimated using an association with the colors of neighboring non-highlighted pixels as non-valid pixels do not obey DRM.

This method enables the true colors of an object to be estimated using a single illumination source and a single image, thus providing the advantage of being a fast method, and can be implemented in a system that does not require a specialized apparatus or setup environment. Furthermore, for at least the valid pixels of the image of an object, the true color of each pixel is determined independently of the other pixels, thus enabling the true colors of an object, having fine or intricate variations of color, to be estimated readily.

For an imaging environment where non-valid pixels constitute a considerable portion of the image, the new art introduces a new multiple illumination, multiple view, or combined multiple illumination and multiple view method for more accurate estimation of the object colors of the strongly highlighted (saturated) image segments. In the proposed multiple illumination, multiple view, or combined multiple illumination and multiple view approach, for each abovementioned non-valid pixel, a corresponding valid pixel is obtained from the other image(s). Though this approach utilizes more than one image or light source, it uses the RGB projection approach for image highlight correction, thus still maintaining the advantage of enabling the true colors of an object, having fine or intricate variations of color, to be estimated readily. Furthermore, a minimum of two images or illumination is sufficient for this purpose, as specular reflectance observed in a pixel of one image will not be observed in the corresponding pixel of another image captured under a different setup of illumination, view, or combination thereof.

BEST MODE FOR CARRYING OUT THE INVENTION

First, the relationship of RGB color space and HSV color space, which is relevant to understanding this invention, shall be described briefly.

Figure 3:
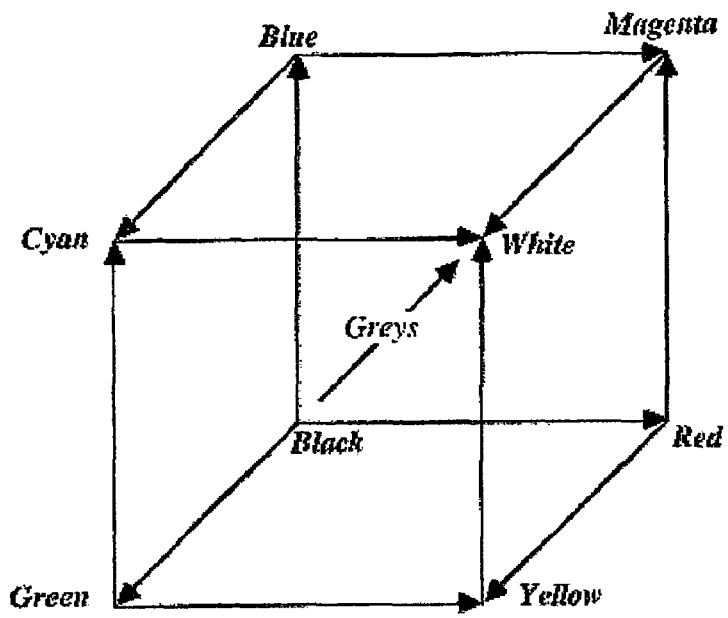
FIG. 3 is a schematic representation of RGB color space.

RGB color space is a hardware-oriented scheme that is based on the way camera sensors and display phosphors work. In RGB color space, the three primary colors of red, green and blue are assigned to the three independent axes of a cube as shown in FIG. 3. In this space, the grey scale lies along the cube diagonal with additive progression from black to white. The complementary colors of cyan, magenta, and yellow (CMY), which are used for printing, are located on the opposite corners such that combining green and blue produce cyan, blue and red produce magenta, and red and green produce yellow.

Figure 4:
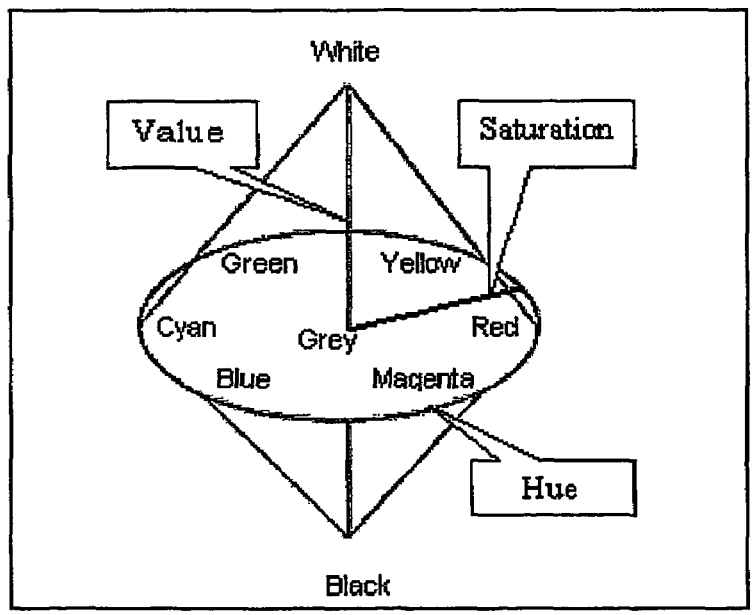
FIG. 4 is a schematic representation of HSV color space.

Although RGB color space is very useful for image representation, there are other encoding schemes that are more useful in image analysis. One such color space is hue, saturation and value (HSV) color space, which is illustrated in FIG. 4. In this space, the primary colors lie along a ring and are separated from each other by 120 degrees, the secondary colors lie in-between the primary colors, and a solid ring of colors spanning all of the spaces between the primaries is created. The solid ring, which holds the hue coordinate, indicates the color as described by wavelength. The radius of the ring, which holds the saturation coordinate, indicates the amount of color that is present. A line normal to the hue-saturation plane holds the value (intensity) coordinate and indicates the amount of light that is present.

The HSV model closely resembles human perception of color and its components are similar to the artist's concept of tint, shade and tone. The space in which these values are plotted can be shown by a pair of circular cones, as shown in FIG. 4. Actually, the 3D representation of the HSV model is derived from the RGB model cube. As indicated in "Hue, Saturation, and Value Color Model", when the RGB cube is viewed along the grey diagonal, a hexagonal shape, which is the HSV hexacone, can be seen.

Figure 1:
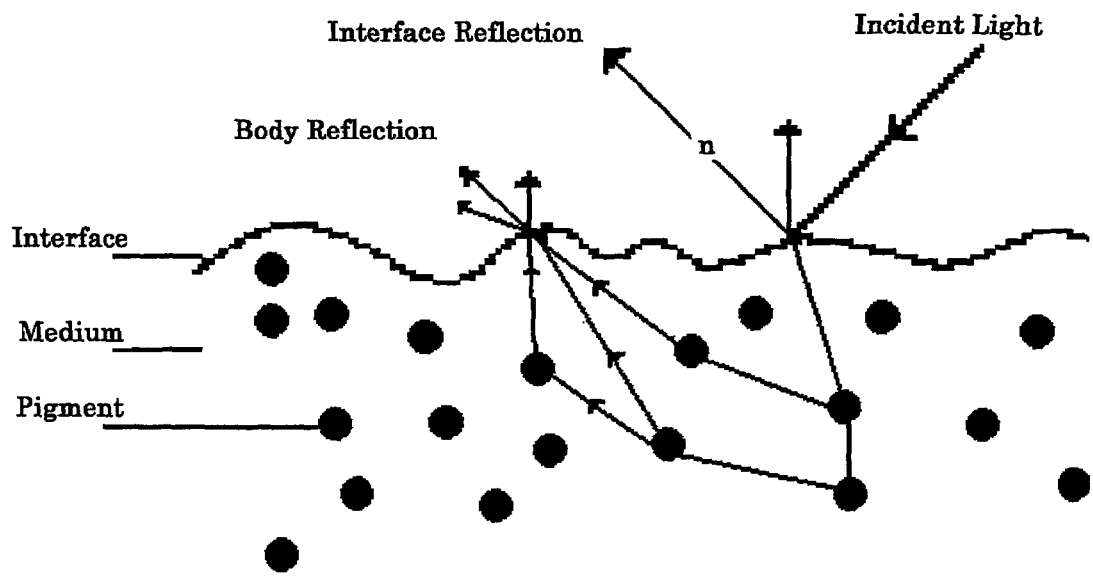
FIG. 1 is a schematic view of light reflection by a dielectric material.
Figure 2:
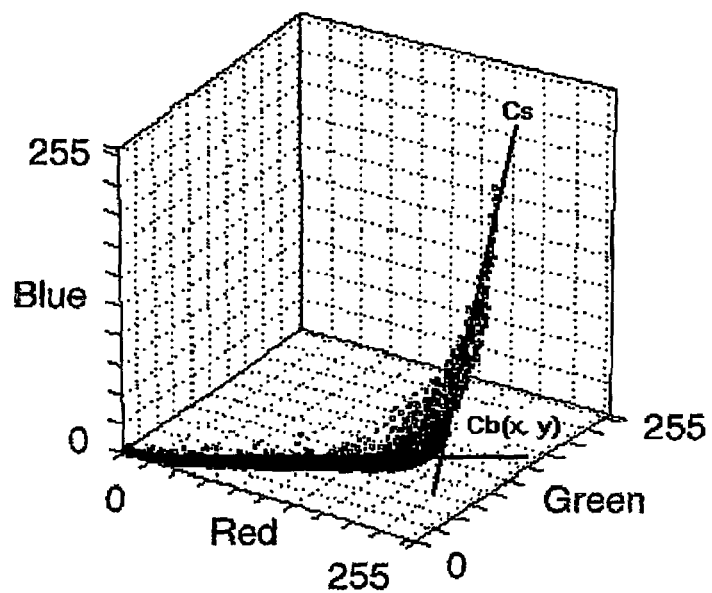
FIG. 2 is a perspective view of a dielectric object's reflectance color distribution in RGB color space.

FIG. 2 shows a perspective view of a dielectric object's reflectance color distribution in RGB color space. If the same points in the cube are viewed by looking in the direction of the light source vector $C_s$, the specular reflectance points should ideally appear as a single point (clouds of overlapped points, in general). Experimental results of this phenomenon, using an image of a bread sample, shall now be discussed.

Figure 5:
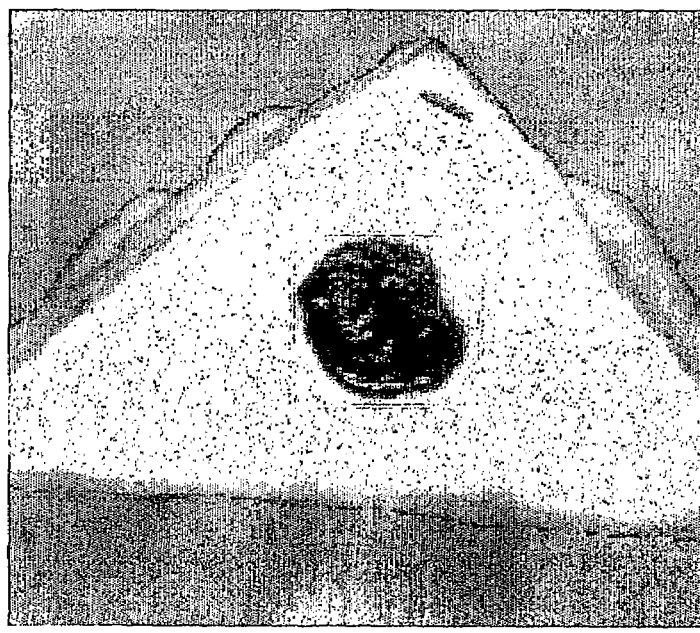
FIG. 5 is an image of a bread sample with a highlighted portion enclosed in an oval shape.
Figure 6:
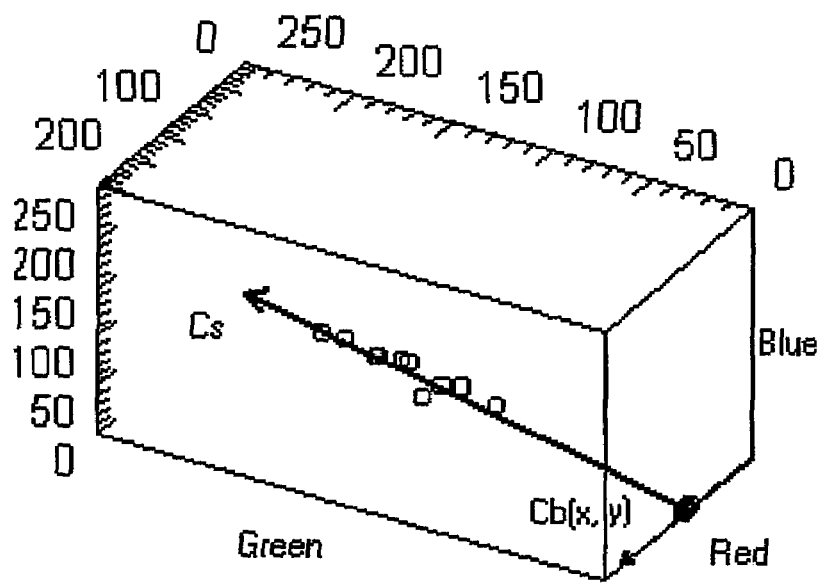
FIG. 6 is a perspective view of the specular and object colors of the bread sample image of FIG. 5.
Figure 7:
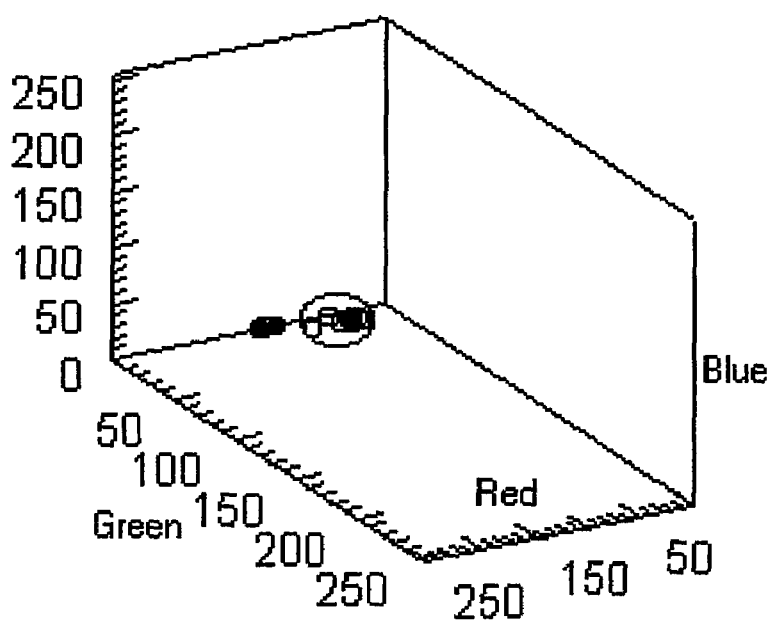
FIG. 7 shows the data of FIG. 6 as viewed along the light source vector.

FIG. 5 shows an image of a bread sample covered with a transparent film. This Figure is shown in the form of a grey scale representation due to limitations in the use of colors. FIG. 6 is analogous to FIG. 2 and is a perspective view of the specular and object colors of the portion inside the oval shape shown in FIG. 5. This portion contains highlighted parts, which are due to specular reflection of the illumination light by the transparent film. FIG. 7 shows the same data as viewed along the light source vector $C_s$. For the sake of clarity, only ten points of each reflectance type (non-highlighted and highlighted) are shown.

As can be understood from FIG. 7, when the object color points are projected along the light source vector, the points converge together around non-highlighted points that reveal the underlying colors. Projection onto a plane, which is perpendicular to the light source vector $C_s$ and shall be referred to as the x-y plane, is thus equivalent to nulling the $C_s$ vector.

In the present invention, this x-y plane is associated with an illumination specific HSV coordinate system by means of a polar coordinate transformation or r, θ conversion. In other words, this x-y plane is equivalent, via an r, θ conversion and offset operations, to an illumination specific S-H plane, which is skewed and offset in origin in relation to the S-H plane of the above-described standard HSV coordinate system. The key element in the highlight processing procedure of the new art is this illumination specific HSV color coordinate system. The invention defines the illumination specific HSV color coordinate system as that which is obtained by viewing the RGB cube in the direction of the light source vector. Such an illumination specific HSV color coordinate system will therefore have its intensity axis along the light source vector and its S-H plane perpendicular to the light source vector. In fact, the standard HSV color coordinate system, derived from the RGB color coordinate system by viewing the RGB cube in the direction of grey diagonal, can be treated as a special case of the illumination specific HSV color coordinate system for a colorless illuminant.

Figure 8:
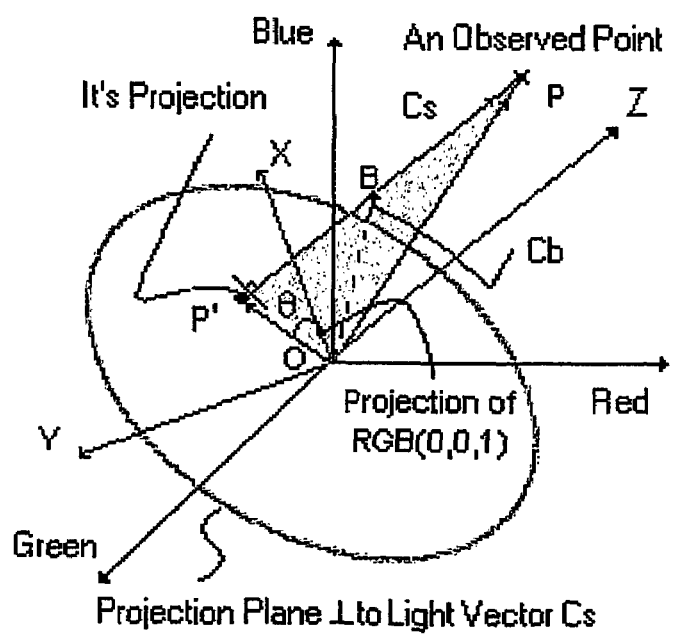
FIG. 8 is a schematic view of the projection of an image pixel onto the x-y plane.

With the highlight correction method, based on the illumination specific HSV coordinate system, the RGB image coordinates of the image pixels are projected along the direction of the intensity axis onto the x-y plane as shown in FIG. 8. The projected points are then associated with the hue (H) and saturation (S) coordinates, thus revealing the underlying color of the projected image points that contain highlights. An appropriate value coordinate estimation is then performed to provide a highlight free image in the standard HSV color coordinate system, which can subsequently be transformed into an equivalent highlight free image in the RGB color coordinate system.

Figure 9:
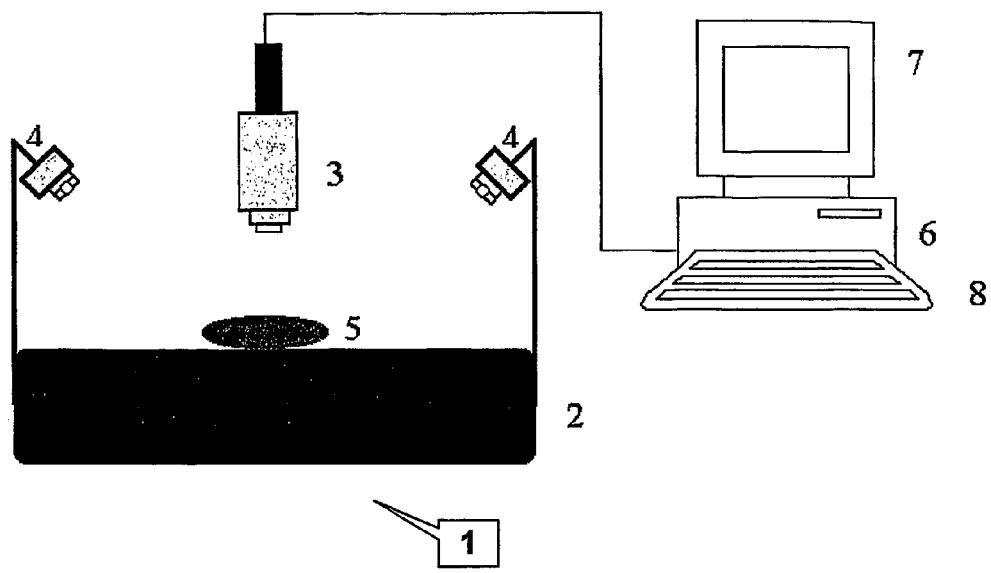
FIG. 9 is a schematic view of an image acquisition system, which is an embodiment of this invention.

A preferred embodiment of this invention shall now be described. FIG. 9 is a schematic view of an image acquisition system 1, which is an embodiment of this invention. Image acquisition system 1 is comprised of a sample stage 2, a camera 3 (FUJIX DS-330; 8-bit; 1.4M pixels; made by Fuji Film Corp.), and a light source 4. Camera 3 is the color imaging device and is set normal to the sample stage. Light source 4 is comprised of two pairs of special fluorescent lamps (True Light; color rendering index=91; color temperature=5500K; made by DURO-TEST), which are set to illuminate a sample object 5 (bread in the case of the present example) at an angle of incidence of 450. Camera 3 is connected via an RS-232C cable to a computer 6.

An exemplary case of obtaining images for highlight correction by a method of this invention shall now be described. In this example, camera 3 was set to auto focus, manual exposure, and manual aperture mode. A white diffuser paper (not shown), having a 90% reflectivity in the visible range, was set on sample stage 2 and used for white balance adjustment of camera 3. Camera 3 was then held manually to obtain images of the pair of lamps of light source 4 at direct incidence. Two images of light source 4 were thus captured at different exposure time and aperture settings of camera 3, which were set so that there were no saturated pixels. These light source images LI1 and LI2 of light source 4 were then transferred as JPEG images to computer 6.

The exposure time, aperture, height, and zooming factor of camera 3 were then adjusted so that the reflectance RGB image of white diffuser paper will be such that the R, G, and B values of this RGB image will be approximately 80% of camera 3's dynamic ranges for R, G, and B, respectively, to ensure that the R, G, and B values of even the brightest non-highlighted pixel of an object image will be within 80% of camera 3's dynamic ranges. This also ensures that a pixel with an R, G, or B value in the excess of 80% of the corresponding dynamic range must be a highlighted pixel. However, it should be noted that a pixel with R, G, and B values less than 80% of the corresponding dynamic ranges may either be a highlighted pixel or a non-highlighted pixel. The exposure time was thus set to 10 msec, the aperture to F5.6, and the height to 46.3 cm. The dark signal and the reference signal of camera 3 were then measured. The abovementioned white diffuser paper was used as the reference sample and its image IREF was transferred as a JPEG image to computer 6.

A uniform blue background, for facilitating background elimination, was then set on sample stage 2 and sample object 5 was set on this blue background. The sample object image OI that was captured by camera 3 under the abovementioned conditions was then transferred as a JPEG image to computer 6 and the abovementioned light source images and object image were subject to the below-described processing by a computer program.

Figure 10:
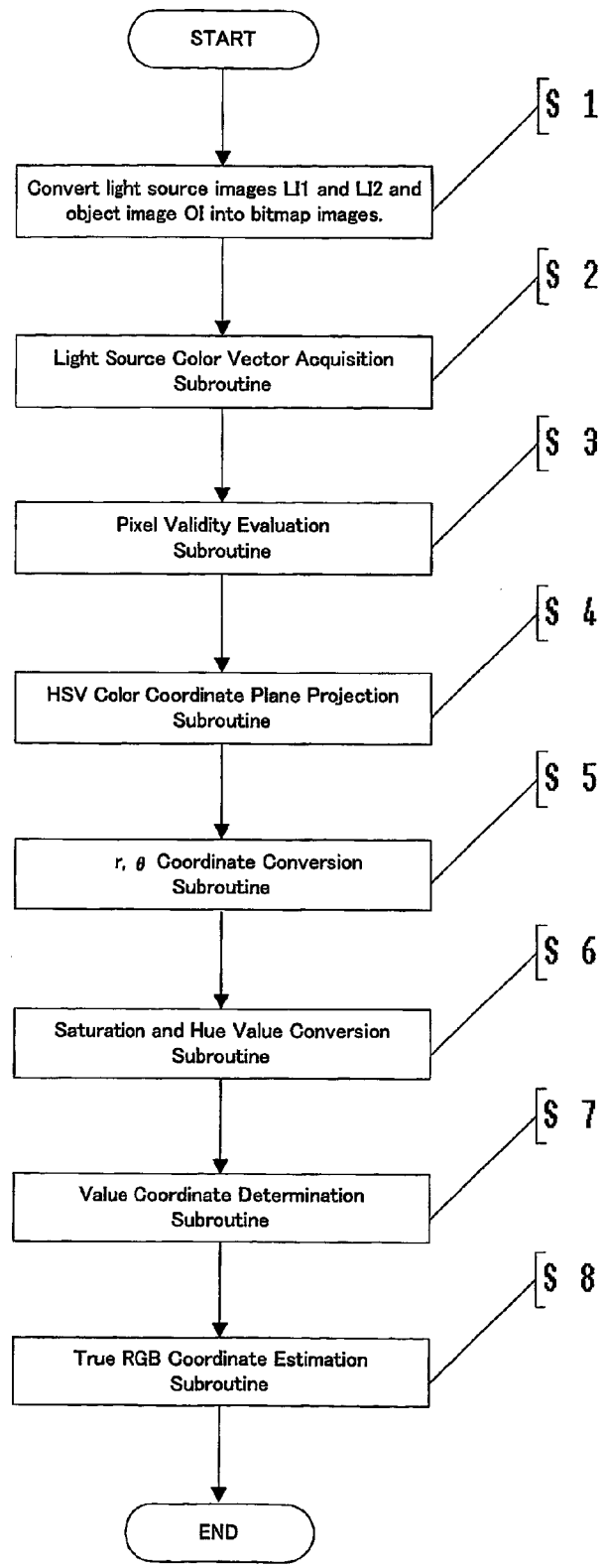
FIG. 10 is a flowchart of a highlight correction program, which is an embodiment of this invention.

FIG. 10 is a flowchart of the highlight correction program that is installed in computer 6. First, in step S1, light source images LI1 and LI2 and object image OI are respectively converted into bitmap images. Light source images LI1 and LI2 are then subject to a light source color vector acquisition subroutine (S2) to obtain the color of light source 4 as a vector in RGB color space. That is, for each of the light source images LI1 and LI2, the average RGB values of a central region of the image is obtained, and from these average RGB coordinates $(R_{L1}, G_{L1}, B_{L1})$ and $(R_{L2}, G_{L2}, B_{L2})$ of the two images, the RGB coordinates $(R_{LV}, G_{LV}, B_{LV})$ of a normalized unity light source vector LV are obtained as follows:

$$R_{LV}=(R_{L1}-R_{L2})/\{(R_{L1}-R_{L2})^2+(G_{L1}-G_{L2})^2+(B_{L1}-B_{L2})^2\}^{1/2} \quad \text{Eq. (3)}$$

$$G_{LV}=(G_{L1}-G_{L2})/\{(R_{L1}-R_{L2})^2+(G_{L1}-G_{L2})^2+(B_{L1}-B_{L2})^2\}^{1/2} \quad \text{Eq. (4)}$$

$$B_{LV}=(B_{L1}-B_{L2})/\{(R_{L1}-R_{L2})^2+(G_{L1}-G_{L2})^2+(B_{L1}-B_{L2})^2\}^{1/2} \quad \text{Eq. (5)}$$

Next, in a pixel validity evaluation subroutine (S3), the validity of each pixel of object image OI is evaluated based on the criterion that the RGB coordinates of a valid pixel are within 98% of camera 3's dynamic range of 255, which corresponds to 8 bits. A set of valid pixels, $(R_1, G_1, B_1)$ to $(R_n, G_n, B_n)$ (n is an integer that indicates the number of valid pixels), each of which satisfies all of the following conditions, is thus obtained:

$$R_i \leq 250$$

$$G_i \leq 250$$

$$B_i \leq 250$$

where i=1, 2, . . . n.

Next, in an HSV color coordinate plane projection subroutine (S4), all of the valid pixels $(R_1, G_1, B_1)$ to $(R_n, G_n, B_n)$ of object image OI are projected, along the unity light source vector LV, onto the x-y plane of an illumination specific HSV color coordinate system. With this coordinate system, the x-y plane is defined as the plane that is perpendicular to the unity light source vector LV and contains the origin of RGB color space, the origin is defined by the origin of the RGB space, the x-axis is defined by the axis, which connects abovementioned origin and the point of projection of the unit base vector, OX (0, 0, 1), along the unity light source vector LV onto the x-y plane, the y-axis is defined as the axis perpendicular to the x-axis and lying in the x-y plane, and the z-axis is defined as the axis, which passes through the origin and is perpendicular to both the x-axis and y-axis. That is, for each valid pixel ($R_i$, $G_i$, $B_i$) (i=1 to n), the following equations are used to obtain the coordinates of the projected pixel ($R'_i$, $G'_i$, $B'_s$) (i=1 to n):

$$PP' = |(R_{LV} \times R_i) + (G_{LV} \times G_i) + (B_{LV} \times B_i)| \quad \text{Eq. (6)}$$

$$R'_i = R_i - (PP' \times R_{LV}) \quad \text{Eq. (7)}$$

$$G'_i = G_i - (PP' \times G_{LV}) \quad \text{Eq. (8)}$$

$$B'_i = B_i - (PP' \times B_{LV}) \quad \text{Eq. (9)}$$

The projected pixels ($R'_i$, $G'_i$, $B'_i$) are then subject to an r, θ coordinate conversion subroutine (S5), in which the coordinates of the projected pixels ($R'_i$, $G'_i$, $B'_i$) on the x-y plane are converted into the polar coordinates of a polar coordinate system with which the θ coordinate is associated with the hue value and the r coordinate is associated with the saturation value. That is, for each projected pixel ($R'_i$, $G'_i$, $B'_i$) (i=1 to n), $r_i$, which is the length of the radius vector $OP'_i$ from the origin to a projected pixel ($R'_i$, $G'_i$, $B'_i$), and $θ_i$, which is the counterclockwise angle in degrees of each projected pixel with respect to the x-axis vector OX, are determined as follows:

$$r_i = |OP'_i| = (R'^2_i + G'^2_i + B'^2_i)^{1/2} \quad \text{Eq. (10)}$$

$$θ_i = \cos^{-1}((OX \cdot OP'_i)/(|OX| \cdot |OP'_i|)) \quad \text{Eq. (11)}$$

where · denotes the dot product. The cross product of the vectors $OP'_i$ and OX is then used to distinguish an angle $θ_i$ from its complement. That is, if $(OX \otimes OP'_i)$ (where $\otimes$ denotes the cross product) is less than 0, the corresponding $θ_i$ is set equal to $360.0 - θ_i$.

Next in a saturation and hue value conversion subroutine (S6), the r, θ coordinates are converted to saturation and hue values. In this subroutine, first the RGB coordinates of the three pure primary colors RED (=(255, 0, 0)), GREEN (=(0, 255, 0)), and BLUE (=(0, 0, 255)) are projected, along the abovementioned unity light source vector LV, onto the abovementioned x-y plane of the illumination specific HSV coordinate system. That is, for example, the projection of the primary color RED (=(255, 0, 0)) onto the illumination HSV coordinate system is carried out by the following equations:

$$\text{R coordinate of projected point of RED} = R'\text{RED} = 255 - (|(R_{LV} \times 255) + (G_{LV} \times 0) + (B_{LV} \times 0)| \times R_{LV}) \quad \text{Eq. (12)}$$

$$\text{G coordinate of projected point of RED} = G'\text{RED} = 0 - (|(R_{LV} 255) + (G_{LV} \times 0) + (B_{LV} \times 0)| \times G_{LV}) \quad \text{Eq. (13)}$$

$$\text{B coordinate of projected point of RED} = B'\text{RED} = 0 - (|(R_{LV} \times 255) + (G_{LV} \times 0) + (B_{LV} \times 0)| \times B_{LV}) \quad \text{Eq. (14)}$$

This projected point is then subject to the same r, θ coordinate conversion described above to provide the coordinates $r_{REDIS}$ and $θ_{REDIS}$ in the x-y plane of the illumination specific HSV coordinate system. That is, for the projected point ($R'_{RED}$, $G'_{RED}$, $B'_{RED}$), $r_{REDIS}$, which is the length of the radius vector ORED' from the origin to ($R'_{RED}$, $G'_{RED}$, $B'_{RED}$), and $θ_{REDIS}$, which is the counterclockwise angle in degrees of ($R'_{RED}$, $G'_{RED}$, $B'_{RED}$) with respect to the x-axis vector OX, are determined as follows:

$$r_{REDIS} = |\text{ORED}'| = (R'^2_{RED} + G'^2_{RED} + B'^2_{RED})^{1/2} \quad \text{Eq. (15)}$$

$$θ_{REDIS} = \cos^{-1}((OX \cdot \text{ORED}')/(|OX| \cdot |\text{ORED}'|)) \quad \text{Eq. (16)}$$

where · denotes the dot product.

The cross product of the vectors ORED' and OX is then used to distinguish an angle $θ_{REDIS}$ from its complement. That is if $(OX \otimes \text{ORED}')$ (where $\otimes$ denotes the cross product) is less than 0, the corresponding $θ_{REDIS}$ is set equal to $360.0 - θ_{REDIS}$.

The above processes are repeated for GREEN and BLUE to obtain their respective r, θ coordinates $r_{GREENIS}$, $θ_{GREENIS}$ and $r_{BLUEIS}$, $θ_{BLUEIS}$.

Figure 11:
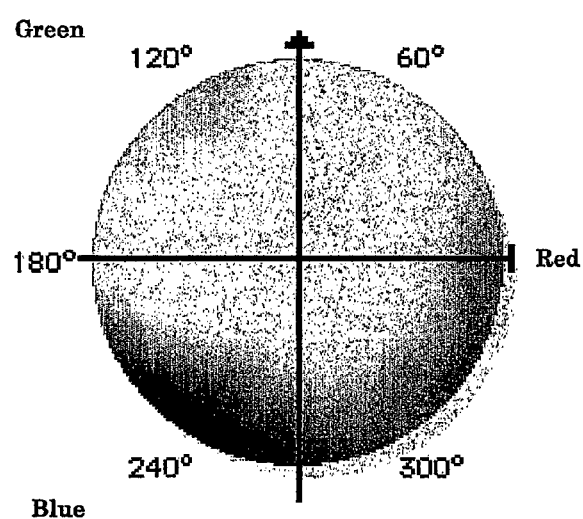
FIG. 11 is a graphical representation of the S-H plane.

The saturation (S) and hue (H) values of the primary colors RED, GREEN, and BLUE in the S-H plane of the standard HSV color coordinate system are known and are S=255, H=0°; S=255, H=120°; and S=255, H=240°, respectively, as shown in graphical representation of the S-H plane shown FIG. 11, which is shown in the form of a grey scale representation due to limitations in the use of colors. Here, the standard saturation (S) range notation of 0-1, or 0%-100% is denoted by the range 0-255 of camera 3 to simplify its association with the projected RGB values. The scaling factors, $SF_{RED}$, $SF_{GREEN}$, and $SF_{BLUE}$, and the offset, ANGDIFF, that associate the x-y plane of the illumination specific HSV color coordinate system and the standard HSV color coordinate system are thus derived as follows:

$$SF_{RED} = (255/r_{REDIS}) \quad \text{Eq. (17)}$$

$$SF_{GREEN} = (255/r_{GREENIS}) \quad \text{Eq. (18)}$$

$$SF_{BLUE} = (255/r_{BLUEIS}) \quad \text{Eq. (19)}$$

$$\text{ANGDIFF} = θ_{REDIS} - 0° \quad \text{Eq. (20)}$$

The above scaling factors $SF_{RED}$, $SF_{GREEN}$, and $SF_{BLUE}$ and offset ANGDIFF are then applied to r, θ coordinates $r_i$ and $θ_i$ of the projected image pixel points as follows to obtain the estimated true saturation $S_i$ and hue $H_i$ values, respectively, of the projected image pixel points:

$$H_i = θ_i - \text{ANGDIFF} \quad \text{Eq. (21)}$$

$$H_i = 360.0° + H_i \text{ if } H_i < 0.0° \quad \text{Eq. (22)}$$

$$S_i = r_i \times SF_{RED} \text{ if } H_i < 60.0° \text{ or } H_i \geq 300.0° \quad \text{Eq. (23)}$$

$$S_i = r_i \times SF_{GREEN} \text{ if } 60.0° \leq H_i < 180.0° \quad \text{Eq. (24)}$$

$$S_i = r_i \times SF_{BLUE} \text{ if } 180.0° \leq H_i < 300.0° \quad \text{Eq. (25)}$$

To summarize the above processes, the valid pixels ($R_i$, $G_i$, $B_i$) (i=1 to n) of object image OI are mapped along the unity light source vector LV onto the x-y plane of the illumination specific HSV color coordinate system as projected pixels ($R'_i$, $G'_i$, $B'_s$) (i=1 to n), then converted to polar coordinates ($r_i$, $θ_i$) (i=1 to n), which are furthermore converted to SH coordinates ($S_i$, $H_i$). What must now be carried out is the estimation of the non-highlight value coordinate $V_i$ of each valid pixel.

Figure 12:
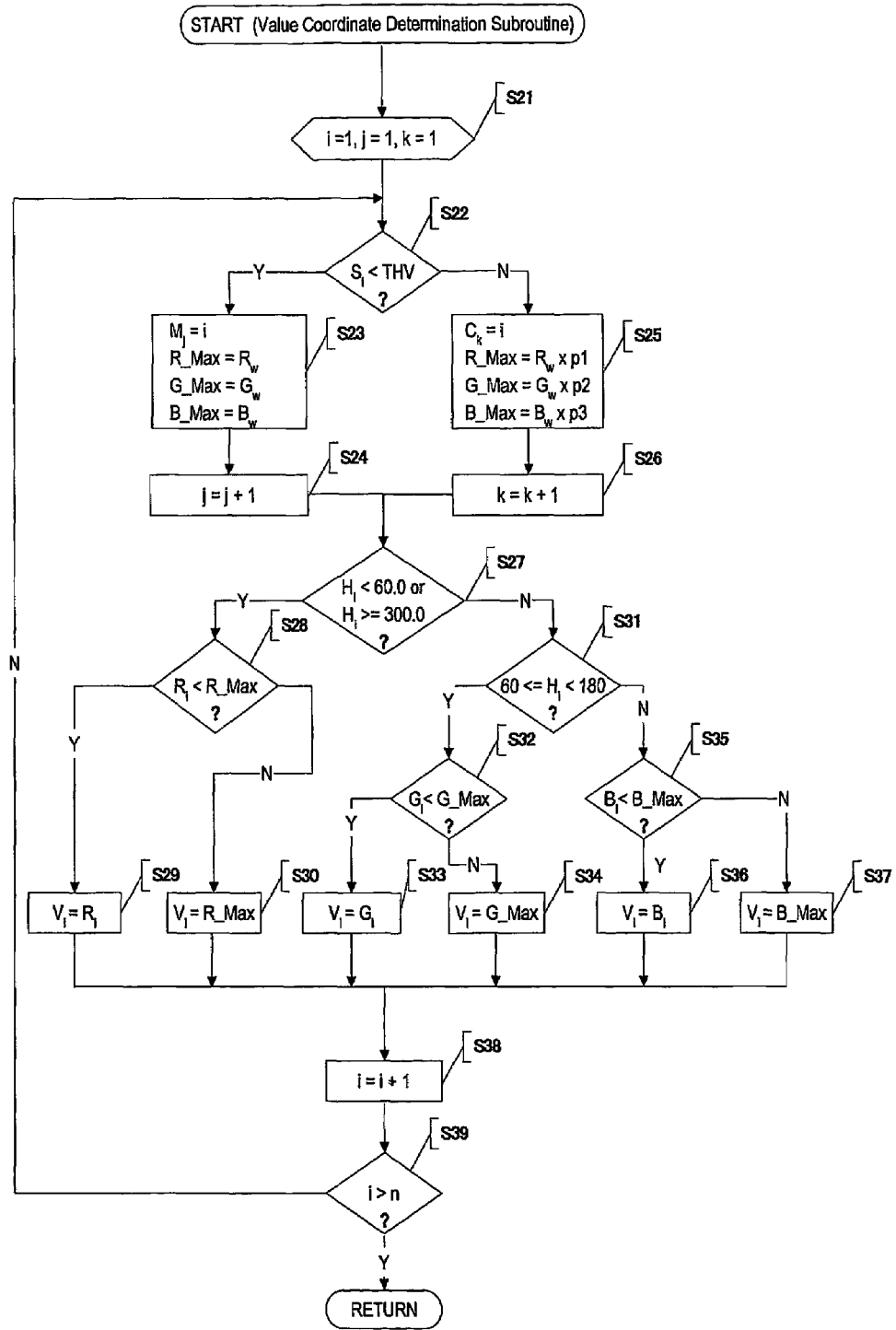
FIG. 12 is a flowchart of a non-highlight value coordinate determination subroutine.

The non-highlight value coordinate $V_i$ of each valid pixel is estimated in a non-highlight value coordinate determination subroutine (S7). FIG. 12 shows a flowchart of this subroutine.

First, in step S21, the values of indices i, j, and k are initialized to 1. Then in step S22, it is judged whether or not the saturation (S) value of the ith pixel is less than a threshold value THV. In the present embodiment, the threshold value THV is set to 25% of the full scale of camera 3.

If the S value of the ith pixel is judged to be less than the threshold value THV, the ith pixel is deemed to be a monochromatic pixel and the monochromatic pixel index $M_j$ is set equal to i, and the maximum non-highlight red value, R_Max, maximum non-highlight green value, G_Max, and maximum non-highlight blue value, B_Max, which are to be used in subsequent steps, are set as follows in step S23:

$$R\_Max = R_W \quad \text{Eq. (26)}$$

$$G\_Max = G_W \quad \text{Eq. (27)}$$

$$B\_Max = B_W \quad \text{Eq. (28)}$$

where $R_W$ is the R value of the white diffuser image, $G_W$ is the G value of the white diffuser image, and $B_W$ is the B value of the white diffuser image. That is, $R_W$, $G_W$, and $B_W$ are the brightest non-highlighted intensities that can be obtained under the image acquisition setup described above. The index j is then incremented in step S24 and then step S27 is entered.

On the other hand, if the S value of the ith pixel is judged to be greater than or equal to the threshold value THV, the ith pixel is deemed to be a colored pixel, and the colored pixel index $C_k$ is set equal to i, and R_Max, G_Max, and B_Max are set as follows in step S25:

$$R\_Max = R_W \times \rho 1 \quad \text{Eq. (29)}$$

$$G\_Max = G_W \times \rho 2 \quad \text{Eq. (30)}$$

$$B\_Max = B_W \times \rho 3 \quad \text{Eq. (31)}$$

In the above, $\rho 1$, $\rho 2$, and $\rho 3$ are the reflectivity ratios of a red diffuser, green diffuser, and blue diffuser, respectively. In the present embodiment, the reflectivity ratios that are provided by the maker (Japan Color Research Institute) of the respective diffusers were used.

The index k is then incremented in step S26 and then step S27 is entered.

Steps S21 to S26 comprise a maximum non-highlight value determination subroutine.

In step S27, it is judged whether or not the hue value $H_i$ of the ith pixel is such that $H_i < 60.0$ or $H_i \geq 300.0$. If the hue value $H_i$ of the ith pixel is such that $H_i < 60.0$ or $H_i \geq 300.0$, step S28 is entered and whether or not the red ($R_i$) value of the ith pixel is less than the maximum non-highlight red value R_Max is judged. If $R_i$ is less than R_max, the value coordinate $V_i$ of the ith pixel is set equal to $R_i$ in step S29. If $R_i$ is judged not to be less than R_max in step S28, the value coordinate $V_i$ of the ith pixel is set equal to R_Max in step S30. Thereafter, step S38 is entered.

If on the other hand, the hue value $H_i$ of the ith pixel is not such that $H_i < 60.0$ or $H_i \geq 300.0$, step S31 is entered and it is judged whether or not the hue value $H_i$ of the ith pixel is such that $60.0 \leq H_i < 180.0$. If the hue value $H_i$ of the ith pixel is such that $60.0 \leq H_i < 180.0$, step S32 is entered and whether or not the green ($G_i$) value of the ith pixel is less than the maximum non-highlight green value G_Max is judged. If $G_i$ is less than G_max, the value coordinate $V_i$ of the ith pixel is set equal to $G_i$ in step S33. If $G_i$ is judged not to be less than G_max in step S32, the value coordinate $V_i$ of the ith pixel is set equal to G_Max in step S34. Thereafter, step S38 is entered.

If in step S31, it has been judged that the hue value $H_i$ of the ith pixel is not such that $60.0 \leq H_i < 180.0$, step S35 is entered and whether or not the blue ($B_i$) value of the ith pixel is less than the maximum non-highlight blue value B_Max is judged. If $B_i$ is less than B_max, the value coordinate $V_i$ of the ith pixel is set equal to $B_i$ in step S36. If $B_i$ is judged not to be less than B_max in step S35, the value coordinate $V_i$ of the ith pixel is set equal to B_Max in step S37. Thereafter, step S38 is entered.

In step S38, the index i is incremented by 1. Then in step S39, whether or not i is greater than n, which is the number of valid pixels, is judged. If i is not greater than n, a return to step S22 is performed while if i is greater than n, a return to the main routine, shown in FIG. 10, is performed.

Upon return to the main routine, the true RGB coordinate estimation subroutine (S8) is entered. In this subroutine, the true RGB coordinates of each of the valid colored pixels, $(R_{Ci}, G_{Ci}, B_{Ci})$ ($C_i = C_1$ to $C_{k-1}$), are estimated from the S, H, and V values by a known HSV-RGB transformation method, the true RGB coordinates of each of the monochromatic pixels, $(R_{Mi}, G_{Mi}, B_{Mi})$ ($M_i = M_1$ to $M_{j-1}$), are estimated using the following Eq. (32):

$$R = G = B = V \quad \text{Eq. (32)}$$

and the true RGB coordinates of each non-valid pixel are estimated as being equal to the RGB coordinates of a nearest neighboring non-highlighted pixel with respect to the non-valid pixel. In the present example, the pixels were processed from the upper left corner of the image to the lower right corner. The non-highlighted pixel, (i.e., a valid pixel for which the R, G and B values are less than or equal to R_Max, G_Max, and B_Max, respectively, of Eqs. 29, 30 and 31), which was most recently processed prior to a non-valid pixel, is used as the nearest neighboring non-highlight pixel for determining the RGB coordinates of the non-valid pixel.

Figure 13:
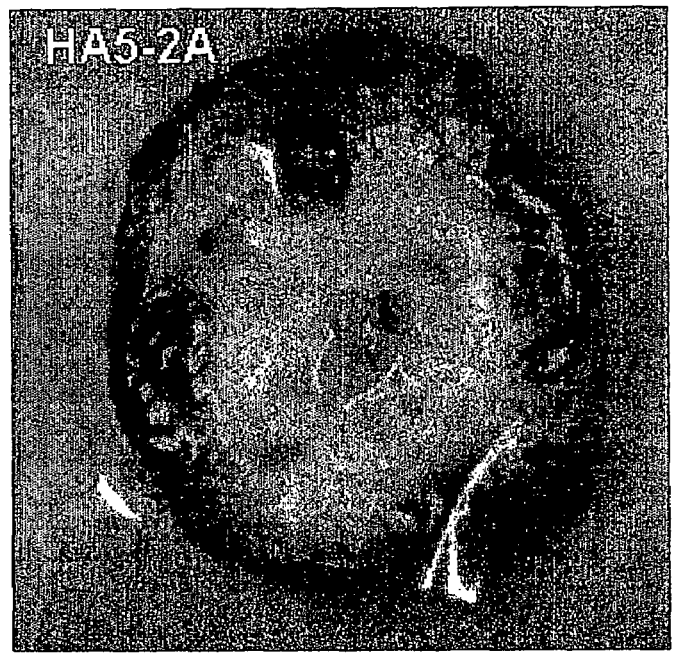
FIG. 13 shows an example of an image prior to highlight correction.
Figure 14:
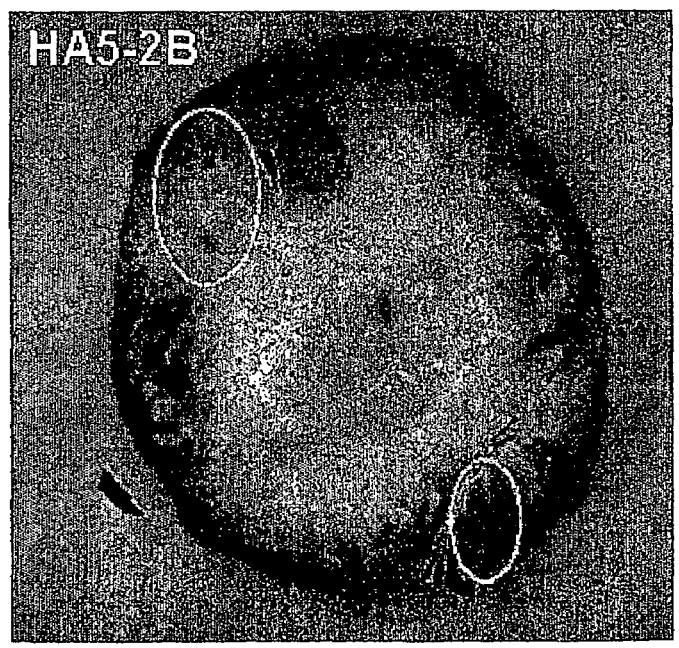
FIG. 14 shows an example of an image obtained by highlight correction of valid pixels by the highlight correction program.
Figure 15:
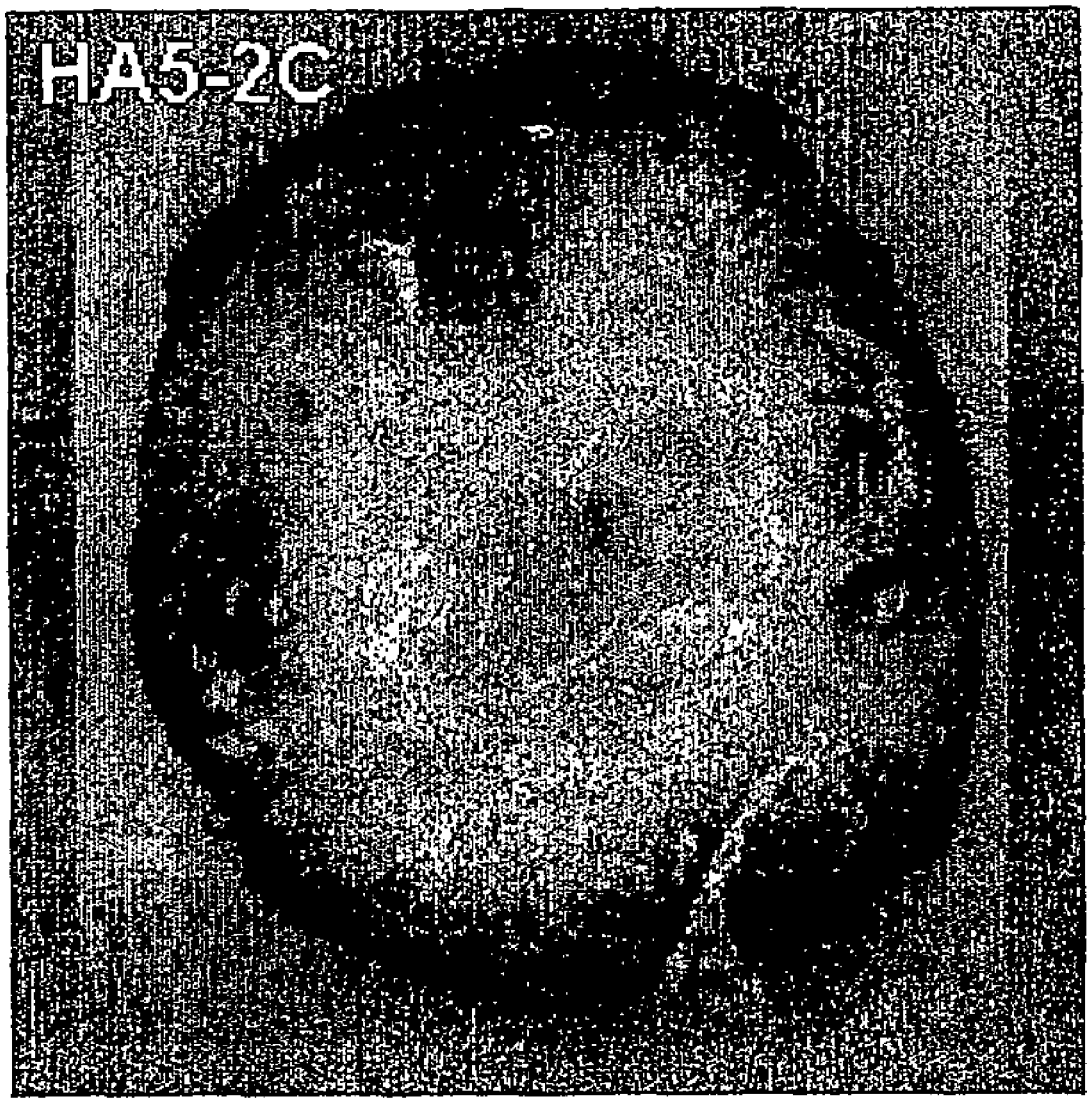
FIG. 15 shows an example of an image obtained by highlight correction, which also include non-valid pixels.

When the estimated true RGB coordinates have been determined for both the valid and non-valid pixels, the true RGB coordinate estimation subroutine (S8) is completed, thus completing the image highlight correction program of the embodiment. An example of an image prior to highlight correction is shown in FIG. 13. This image is that of a bread wrapped in transparent, colorless plastic, and the saturated highlighted parts of high specular reflectance can be seen as bright white parts in the image. FIG. 14 shows an example of an image obtained by highlight correction of valid pixels by the above-described program. Notice how the method has successfully recovered underlying bread colors of the highlighted valid pixels, those which are enclosed in oval shapes. FIG. 15 shows highlight correction of the entire image in which colors of non-valid pixels, those that are marked in black in FIG. 14, are associated with the color of the nearest neighboring non-highlighted pixels. Though these figures are in the form of a grey scale representation due to limitations in the use of colors, it can be seen that the underlying true colors of the bread have been recovered, even in the saturated highlighted parts, using just a single illumination light source and a single image.

The present invention is not limited to the above embodiment, and various modifications can be made within the scope of the invention. For example, though in the embodiment described above, the conditions, such as exposure time, aperture, height, and zooming factor, of the imaging device (camera 3) were adjusted so that the R, G, and B values of the RGB reflectance image of white diffuser paper will be approximately 80% of the imaging device's dynamic ranges for R, G, and B, respectively, the percentage of the imaging device's dynamic ranges that is used to adjust the conditions of the imaging device is not restricted to 80%, and any percentage, which is suitable for the imaging device's dynamic range and by which the objects of this invention can be attained, may be used.

Also, though in the pixel evaluation subroutine described above, a pixel of the object image is evaluated using the criterion that the RGB coordinates of a valid pixel are within 98% of camera 3's dynamic range, any other suitable criterion may be used by which valid pixels, which are pixels that are not fully saturated, can be distinguished from non-valid pixels, which are fully saturated pixels.

Also, though the threshold value THV, for distinguishing between a monochromatic pixel and a colored pixel, was set to 25% of the full scale of camera 3 in the value coordinate determination subroutine described above, this threshold value may be set to any other suitable value by which a monochromatic pixel can be distinguished from a colored pixel.

Also, instead of using the reflectivity ratios, $\rho 1$, $\rho 2$, and $\rho 3$, of a red diffuser, green diffuser, and blue diffuser, respectively, which were provided by the maker of the respective diffusers in the value coordinate determination subroutine described above, images of a red diffuser, green diffuser, and blue diffuser may be obtained by camera 3 in advance and the R_Max, G_Max, and B_Max to be used in the case of a colored pixel may be set equal to the R value $R_R$ of the red diffuser image, the G value $G_G$ of the green diffuser image, and the B value $B_B$ of the blue diffuser image, respectively.

Furthermore, though an embodiment using a single illumination light source and a single object image was described above, two or more object images may be obtained by varying the position, orientation, or combination thereof of a single light source, using a plurality of light sources that differ in position, orientation, or combination thereof, varying the position, orientation, or combination thereof of the object, combining the abovementioned variation of the position, orientation, or combination thereof of a single light source with the abovementioned variation of the position, orientation, or combination thereof of the object, or combining the abovementioned use of a plurality of light sources that differ in position, orientation, or combination thereof and the abovementioned variation of the position, orientation, or combination thereof of the object. In this case, each object image may be obtained under light source and object conditions such that the fully saturated portions (non-valid pixels) of the image will not completely overlap with the fully saturated portions (non-valid pixels) of the other image or images. Or, each object image may be obtained under light source and object conditions such that the highlighted portions of the image will not completely overlap with the highlighted portions of the other image or images, and in this case, the highlighted image pixels may be identified based on that a criterion that an object image pixel, for which any of the R, G, or B values is greater than the corresponding R, G, or B value of the image of a white diffuser, is a highlighted pixel or the criterion that an object image pixel, for which the R value is greater than the R value of the image of a red diffuser or the G value is greater than the G value of the image of a green diffuser or the B value is greater than the B value of the image of a blue diffuser, is a highlighted pixel.

Each image obtained by any of such multiple illumination/view methods may then be subject to an image highlight correction program such as that described above, thereby providing a plurality of sets of estimated true RGB coordinates and then in an estimated true RGB coordinate set synthesizing subroutine, the plurality of sets of estimated true RGB coordinates of the object may be synthesized to form a synthesized set of estimated true RGB coordinates consisting only of estimated true RGB coordinates obtained from valid pixels. Or, the two or more images may be synthesized and the synthesized image may be subject to an image highlight correction program such as that described above to estimate the true colors of the object. Such methods provide the advantage of enabling accurate estimation of the true colors of a highly glossy object, the image of which will tend to contain large areas of saturated or non-valid pixels, and in many cases, just two object images will be necessary to provide an accurate estimation of the true colors.

INDUSTRIAL APPLICABILITY

As has been described above, a method, program, or system by this invention enables the true colors of an object to be determined from the object's recorded image, which may contain, along with the object's true colors, the specular or interface reflectance that appears as highlight or gloss on the object. A method, program, or system by this invention can thus be used in any machine-vision or pattern recognition system that requires determination of an object's true colors in the recognition process. A method, program, or system by this invention is especially effective in cases where the image of the object contains fine or intricate variations of color.

An image that is recorded through glass or other transparent object would contain specular reflectance components in forms of ghost images. A method, program, or system by this invention can be used to filter out such ghost images. A method, program, or system can thus be used in any machine-vision or pattern recognition system that captures objects image through a glass or transparency.

Application in the baking industry can be given as a specific example. An object's surface colors and surface color uniformity are important criteria in the quality control of baked products and are directly related to the optimal baking time. Accurate determination of the optimal baking time is quite complex and depends on the surrounding temperature and humidity level, the oven's temperature, and most importantly, the moisture content of the flours and baking powders that are used in the dough, the exact mixture ratio, and dough development time. According to experts in the field, the optimal backing time varies from batch to batch even for same type of mixtures and compounds. A machine-vision based oven system, which employs an image capturing device that captures images of baked objects through an oven's glass during the actual baking process, can be used to determine the optimal baking time through a feedback mechanism. A method, program, or system of this invention can be employed in such a machine-vision system to correct image highlights and filter out ghost images and thereby provide the true colors of baked objects, which may then be subject to object color analysis for automation of the optimal baking time determination process.

The invention claimed is:

1. An image highlight correction method comprising the steps of:
   obtaining the color of a light source to be used in imaging;
   illuminating said light source onto an object;
   obtaining an RGB reflectance image of said illuminated object using a color imaging device;
   plotting the color of the light source as a vector in RGB color space;
   constructing a plane, which is perpendicular to the light source vector and contains the origin of RGB color space;
   projecting every pixel of said RGB image along the light source vector onto said perpendicular plane;
   constructing an illumination specific HSV color coordinate system by making the origin of the RGB color space be the origin of said illumination specific HSV color coordinate system, projecting the unit base vector, RGB (0, 0, 1), along said light source vector onto said perpendicular plane, making the axis, which connects said projected point and said origin, be the x-axis of said illumination specific HSV color coordinate system, making the axis perpendicular to said x-axis and lying in said perpendicular plane be the y-axis of said illumination specific HSV color coordinate system, and making the axis, which passes through said origin and is perpendicular to said x-axis and y-axis, be the z-axis of said illumination specific HSV color coordinate system;

evaluating the validity of each pixel based on the criterion that the RGB coordinates of a valid pixel are unsaturated, that is, within said color imaging device's dynamic range;

converting the coordinates of the projected RGB image points on the x-y plane into polar coordinates, for which the θ coordinate corresponds to the hue value and the r coordinate corresponds to the saturation value, by setting the positive side of said x-axis to correspond to θ=0□ and determining the r coordinate as the length of the vector from the origin to a projected point and the θ coordinate as the counterclockwise angle in degrees with respect to θ=0□;

converting the r, θ coordinates to saturation (S) and hue (H) values by projecting the RGB coordinates of the three primary colors RED, GREEN, and BLUE onto said plane, determining the r, θ coordinates of the projected points of the three primary colors, determining scaling factors for the respective primary colors and an offset for one primary color such as will provide a correlation of the r, θ coordinates of the primary colors with the known saturation and hue values for the primary colors, and applying said scaling factors and offset to the r, θ coordinates of the projected image pixel points to obtain the correct saturation and hue values, respectively, of the projected image pixel points;

determining the non-highlight value coordinate V of each valid pixel; and estimating the true RGB coordinates of each pixel from said S, H, and V values of each pixel.

2. An image highlight correction method according to claim 1, wherein in said step of determining the non-highlight value coordinate V of each valid pixel, the value coordinate V of each valid pixel is estimated using the following equation if the hue value H of a pixel is such that H<60.0 or H≧300.0 and the red (R) value of the pixel is less than a maximum non-highlight red value (R_Max);

V=R using the following equation if said hue value H is such that H<60.0 or H≧300.0 and the red (R) value of the pixel is not less than said maximum non-highlight red value;

V=R_Max using the following equation if said hue value H is such that 60.0≦H<180.0 and the green (G) value of the pixel is less than a maximum non-highlight green value (G_Max);

V=G using the following equation if said hue value H is such that 60.0≦H<180.0 and the green (G) value of the pixel is not less than said maximum non-highlight green value;

V=G_Max using the following equation if said hue value H is such that 180.0≦H<300.0 and the blue (B) value of the pixel is less than a maximum non-highlight blue value (B_Max);

V=B or using the following equation if said hue value H is such that 180.0≦H<300.0 and the blue (B) value of the pixel is not less than a maximum non-highlight blue value (B_Max):

V=B_Max.

3. An image highlight correction method according to claim 2 further comprising the steps of:

performing white balance adjustment of said color imaging device using a white diffuser;

setting the imaging conditions of said light source and said color imaging device so that the R, G, and B values of the reflectance RGB image of the white diffuser will be a predetermined percentage of the imaging device's dynamic ranges for R, G and B, respectively; and obtaining a reflectance RGB image of the white diffuser; and wherein in said step of determining the non-highlight value coordinate V of each pixel, each valid pixel is distinguished as being a colored pixel or a monochromatic pixel based on the criterion that the saturation (S) value of a colored pixel is less than a threshold value and R_Max, G_Max, and B_Max are set follows in the case of a monochromatic pixel;

$R\_Max=R_W$ $G\_Max=G_W$ $B\_Max=B_W$ where $R_W$ is the R value of the white diffuser image, $G_W$ is the G value of the white diffuser image, and $B_W$ is the B value of the white diffuser image, and R_Max, G_Max, and B_Max are set as follows in the case of a colored pixel:

$R\_Max=R_W\times\square 1$ $G\_Max=G_W\times\square 2$ $B\_Max=B_W\times\square 3$ where □1, □2, and □3 are the ratios of the reflectivity values of red, green and blue diffusers, respectively, with respect to the reflectivity value of said white diffuser.

4. An image highlight correction method according to claim 2 further comprising the steps of:

performing white balance adjustment of said color imaging device using a white diffuser;

setting the imaging conditions of said light source and said color imaging device so that the R, G, and B values of the reflectance RGB image of the white diffuser will be a predetermined percentage of the imaging device's dynamic ranges for R, G and B, respectively; and obtaining reflectance RGB images respectively of the white diffuser, a red diffuser, a green diffuser, and a blue diffuser; and in said step of determining the non-highlight value coordinate V of each pixel, each valid pixel is distinguished as being a colored pixel or a monochromatic pixel based on the criterion that the saturation (S) value of a colored pixel is less than a threshold value and R_Max, G_Max, and B_Max are set follows in the case of a monochromatic pixel;

$R\_Max=R_W$ $G\_Max=G_W$ $B\_Max=B_W$ where $R_W$ is the R value of the white diffuser image, $G_W$ is the G value of the white diffuser image, and $B_W$ is the B value of the white diffuser image, and R_Max, G_Max, and B_Max as follows in the case of a colored pixel:

$$R\_Max=R_R$$

$$G\_Max=G_G$$

$$B\_Max=B_B$$

where $R_R$ is the R value of the red diffuser image, $G_G$ is the G value of the green diffuser image, and $B_B$ is the B value of the blue diffuser image.

5. An image highlight correction method according to claim 3, wherein said threshold value is 25% of the full scale of the color imaging device and/or said predetermined percentage of the imaging device's dynamic ranges is 80% of the imaging device's dynamic ranges.

6. An image highlight correction method according to claim 4, wherein said threshold value is 25% of the full scale of the color imaging device and/or said predetermined percentage of the imaging device's dynamic ranges is 80% of the imaging device's dynamic ranges.

7. An image highlight correction method according to any of claims 1 through 6, wherein in said step of estimating the true RGB coordinates, the true RGB coordinates of each colored pixel are estimated from the S, H, and V values by an HSV-RGB transformation method, the true RGB coordinates of each monochromatic pixel are estimated using the following relationship;

$$R=G=B=V$$

and the true RGB coordinates of each non-valid pixel are estimated using an association with the colors of neighboring valid pixels.

8. An image highlight correction method according to any of claims 1 through 6, wherein in said step of estimating the true RGB coordinates, the true RGB coordinates of each colored are estimated from the S, H, and V values by an HSV-RGB transformation method, the true RGB coordinates of each monochromatic pixel are estimated using the following relationship:

$$R=G=B=V$$

and the true RGB coordinates of each non-valid pixel are estimated using an association with the color of a nearest neighboring non-highlighted pixel with respect to the non-valid pixel.

9. An image highlight correction method according to any of claims 1 through 6, wherein in said step of estimating the true RGB coordinates, the true RGB coordinates of each colored pixel are estimated from the S, H, and V values by an HSV-RGB transformation method, the true RGB coordinates of each monochromatic pixel are estimated using the following relationship;

$$R=G=B=V$$

and the true RGB coordinates of each non-valid pixel are estimated as being equal to the estimated true RGB coordinates of a nearest neighboring non-highlighted pixel with respect to the non-valid pixel.

10. An image highlight correction method according to any of claims 1 through 6, wherein in said step of estimating the true RGB coordinates, the true RGB coordinates of each colored pixel are estimated from the S, H, and V values by an HSV-RGB transformation method, the true RGB coordinates of each monochromatic pixel are estimated using the following relationship;

$$R=G=B=V$$

and the true RGB coordinates of each non-valid pixel are estimated by using an association with the color of a nearest neighboring non-highlighted pixel with respect to the non-valid pixel or by being set equal to the estimated true RGB coordinates of a nearest neighboring non-highlighted pixel with respect to the non-valid pixel, and said nearest neighboring non-highlighted pixel with respect to the non-valid pixel is the non-highlighted pixel that has been processed most recently prior to the processing of the non-valid pixel in said step of estimating the true RGB coordinate of each pixel.

11. An image highlight correction method according to any of claims 1 through 6, wherein said validity of each pixel is evaluated based on the criterion that none of the three RGB coordinates of a valid pixel exceed 98% of the full scale range of the color imaging device.

12. An image highlight correction method, comprising the steps of performing the method of any of claims 1 through 6 to obtain a set of estimated true RGB coordinates of an object;

changing the illumination, viewpoint, or combination of illumination and viewpoint of the object;

performing the method of any of claims 1 through 6 to obtain another set of estimated true RGB coordinates of the object;

repeating said step of changing the illumination, viewpoint, or combination of illumination and viewpoint of the object and said step of performing the method of any of claims 1 through 6; and synthesizing the sets of estimated true RGB coordinates of the object in a manner such that the synthesized set of estimated true RGB coordinates will consist only of estimated true RGB coordinates estimated from valid pixels.

13. An image highlight correction method, comprising the steps of performing the method of any of claims 1 through 6 to obtain a set of estimated true RGB coordinates of an object;

changing the illumination, viewpoint, or combination of illumination and viewpoint of the object;

performing the method of any of claims 1 through 6 to obtain another set of estimated true RGB coordinates of the object;

repeating said step of changing the illumination, viewpoint, or combination of illumination and viewpoint of the object and said step of performing the method of any of claims 1 through 6; and synthesizing the sets of estimated true RGB coordinates of the object in a manner such that the synthesized set of estimated true RGB coordinates will consist only of estimated true RGB coordinates estimated from valid pixels; and wherein the change of illumination, viewpoint, or combination of illumination and viewpoint of the object is accomplished by changing the position, orientation, or combination of the position and orientation of a light source.

14. An image highlight correction method, comprising the steps of performing the method of any of claims 1 through 6 to obtain a set of estimated true RGB coordinates of an object;

changing the illumination, viewpoint, or combination of illumination and viewpoint of the object;

performing the method of any of claims 1 through 6 to obtain another set of estimated true RGB coordinates of the object;

repeating said step of changing the illumination, viewpoint, or combination of illumination and viewpoint of the object and said step of performing the method of any of claims 1 through 6; and synthesizing the sets of estimated true RGB coordinates of the object in a manner such that the synthesized set of estimated true RGB coordinates will consist only of estimated true RGB coordinates estimated from valid pixels; and wherein the change of illumination, viewpoint, or combination of illumination and viewpoint of the object is accomplished by changing the light source to a light source of different color, intensity, position, orientation, or combination thereof.

15. An image highlight correction method, comprising the steps of performing the method of any of claims 1 through 6 to obtain a set of estimated true RGB coordinates of an object;

changing the illumination, viewpoint, or combination of illumination and viewpoint of the object;

performing the method of any of claims 1 through 6 to obtain another set of estimated true RGB coordinates of the object;

repeating said step of changing the illumination, viewpoint, or combination of illumination and viewpoint of the object and said step of performing the method of any of claims 1 through 6; and synthesizing the sets of estimated true RGB coordinates of the object in a manner such that the synthesized set of estimated true RGB coordinates will consist only of estimated true RGB coordinates estimated from valid pixels; and wherein the change of illumination, viewpoint, or combination of illumination and viewpoint of the object is accomplished by changing the position, orientation, or combination of the position and orientation of the object.

16. An image highlight correction method, comprising the steps of performing the method of any of claims 1 through 6 to obtain a set of estimated true RGB coordinates of an object;

changing the illumination, viewpoint, or combination of illumination and viewpoint of the object;

performing the method of any of claims 1 through 6 to obtain another set of estimated true RGB coordinates of the object;

repeating said step of changing the illumination, viewpoint, or combination of illumination and viewpoint of the object and said step of performing the method of any of claims 1 through 6; and synthesizing the sets of estimated true RGB coordinates of the object in a manner such that the synthesized set of estimated true RGB coordinates will consist only of estimated true RGB coordinates estimated from valid pixels; and wherein the change of illumination, viewpoint, or combination of illumination and viewpoint of the object is accomplished by changing the position, field of view, dynamic range, or combination thereof of the color imaging device.

17. An image highlight correction method, comprising the steps of performing the method of any of claims 1 through 6 to obtain a set of estimated true RGB coordinates of an object;

changing the illumination, viewpoint, or combination of illumination and viewpoint of the object;

performing the method of any of claims 1 through 6 to obtain another set of estimated true RGB coordinates of the object;

repeating said step of changing the illumination, viewpoint, or combination of illumination and viewpoint of the object and said step of performing the method of any of claims 1 through 6; and synthesizing the sets of estimated true RGB coordinates of the object in a manner such that the synthesized set of estimated true RGB coordinates will consist only of estimated true RGB coordinates estimated from valid pixels; and wherein the change of illumination, viewpoint, or combination of illumination and viewpoint of the object is performed in a manner such that the fully saturated pixels of the image of the object prior to said change do not completely overlap with the fully saturated pixels of the image of the object subsequent said change.

18. An image highlight correction method, comprising the steps of performing the method of any of claims 1 through 6 to obtain a set of estimated true RGB coordinates of an object;

changing the illumination, viewpoint, or combination of illumination and viewpoint of the object;

performing the method of any of claims 1 through 6 to obtain another set of estimated true RGB coordinates of the object;

repeating said step of changing the illumination, viewpoint, or combination of illumination and viewpoint of the object and said step of performing the method of any of claims 1 through 6; and synthesizing the sets of estimated true RGB coordinates of the object in a manner such that the synthesized set of estimated true RGB coordinates will consist only of estimated true RGB coordinates estimated from valid pixels; and wherein the change of illumination, viewpoint, or combination of illumination and viewpoint of the object is performed in a manner such that the highlighted pixels of the image of the object prior to said change do not completely overlap with the highlighted pixels of the image of the object subsequent said change.

19. An image highlight correction method according to any of claims 1 through 6, wherein the image that is obtained in said step of obtaining an RGB reflectance image of said object is a synthetic image that is obtained by synthesizing images, each of which has been obtained under a different positioning or orientation of said light source or a different positioning or orientation of said object.

20. An image highlight correction method according to any of claims 1 through 6, wherein the image that is obtained in said step of obtaining an RGB reflectance image of said object is a synthetic image that is obtained by synthesizing images, each of which has been obtained under a different positioning or orientation of said light source or a different positioning or orientation of said object and the fully saturated pixels of each image of the object do not completely overlap with the fully saturated pixels of the other images of the object.

21. An image highlight correction method according to any of claims 1 through 6, wherein the image that is obtained in said step of obtaining an RGB reflectance image of said object is a synthetic image that is obtained by synthesizing images, each of which has been obtained under a different positioning or orientation of said light source or a different positioning or orientation of said object and the highlighted pixels of each image of the object do not completely overlap with the highlighted pixels of the other images of the object.

22. An image highlight correction method, comprising the steps of
performing the method of any of claims 1 through 6 to obtain a set of estimated true RGB coordinates of an object;
identifying the highlighted image pixels;
changing the illumination, viewpoint, or combination of illumination and viewpoint of the object;
performing the method of any of claims 1 through 6 to obtain another set of estimated true RGB coordinates of the object;
repeating said step of identifying the highlighted image pixels, said step of changing the illumination, viewpoint, or combination of illumination and viewpoint of the object, and said step of performing the method of any of claims 1 through 6; and
synthesizing the sets of estimated true RGB coordinates of the object in a manner such that the synthesized set of estimated true RGB coordinates will consist only of estimated true RGB coordinates estimated from valid pixels; and
wherein the change of illumination, viewpoint, or combination of illumination and viewpoint of the object is performed in a manner such that the highlighted pixels of the image of the object prior to said change do not completely overlap with the highlighted pixels of the image of the object subsequent said change.

23. An image highlight correction method, comprising the steps of
performing the method of any of claims 1 through 6 to obtain a set of estimated true RGB coordinates of an object;
identifying the highlighted image pixels;
changing the illumination, viewpoint, or combination of illumination and viewpoint of the object:
performing the method of any of claims 1 through 6 to obtain another set of estimated true RGB coordinates of the object;
repeating said step of identifying the highlighted image pixels, said step of changing the illumination, viewpoint, or combination of illumination and viewpoint of the object, and said step of performing the method of any of claims 1 through 6; and
synthesizing the sets of estimated true RGB coordinates of the object in a manner such that the synthesized set of estimated true RGB coordinates will consist only of estimated true RGB coordinates estimated from valid pixels; and
wherein the change of illumination, viewpoint, or combination of illumination and viewpoint of the object is performed in a manner such that the highlighted pixels of the image of the object prior to said change do not completely overlap with the highlighted pixels of the image of the object subsequent said change, and
in the step of identifying the highlighted image pixels, an object image pixel, for which any of the R, G, or B values is greater than the corresponding R, G or B value of the image of a white diffuser, is identified as being a highlighted pixel.

24. An image highlight correction method, comprising the steps of
performing the method of any of claims 1 through 6 to obtain a set of estimated true RGB coordinates of an object;
identifying the highlighted image pixels;
changing the illumination, viewpoint, or combination of illumination and viewpoint of the object;
performing the method of any of claims 1 through 6 to obtain another set of estimated true RGB coordinates of the object;
repeating said step of identifying the highlighted image pixels, said step of changing the illumination, viewpoint, or combination of illumination and viewpoint of the object, and said step of performing the method of any of claims 1 through 6; and
synthesizing the sets of estimated true RGB coordinates of the object in a manner such that the synthesized set of estimated true RGB coordinates will consist only of estimated true RGB coordinates estimated from valid pixels; and
wherein the change of illumination, viewpoint, or combination of illumination and viewpoint of the object is performed in a manner such that the highlighted pixels of the image of the object prior to said change do not completely overlap with the highlighted pixels of the image of the object subsequent said change, and
in the step of identifying the highlighted image pixels, an object image pixel, for which the R value is greater than the R value of the image of a red diffuser or the G value is greater than the G value of the image of a green diffuser or the B value is greater than the B value of the image of a blue diffuser, is identified as being a highlighted pixel.

25. A computer-readable recording medium that stores a computer program for image highlight correction, wherein the computer program causes a computer to execute
a light source color vector acquisition step, in which the color of a light source is obtained as a vector in RGB color space;
an object RGB image acquisition step, in which an RGB image of an object illuminated by said light source is obtained;
a pixel validity evaluation step, in which the validity of each pixel is evaluated based on the criterion that the RGB coordinates of a valid pixel are within the color imaging device's dynamic range,
an HSV color coordinate plane projection step, in which every pixel of said RGB image are projected, along the light source vector, onto the x-y plane of an illumination specific HSV color coordinate system, with which the x-y plane is defined as the plane that is perpendicular to the light source vector and contains the origin of RGB color space, the origin is defined by said origin of RGB space, the x-axis is defined by the axis, which connects said origin and the point of projection of the unit base vector, RGB(0, 0, 1), along said light source vector onto said x-y plane, the y-axis is defined as the axis perpendicular to said x-axis and lying in said perpendicular plane, and the z-axis is defined as the axis, which passes through said origin and is perpendicular to said x-axis and y-axis;
an r, θ coordinate conversion step, in which the coordinates of the projected points on the x-y plane are converted into polar coordinates, with which the θ coordinate corresponds to the hue value and the r coordinate corresponds to the saturation value, by setting the positive side of said x-axis to correspond to θ=0□ and determining the r coordinate as the length of the vector from the origin to a projected point and the θ coordinate as the counterclockwise angle in degrees with respect to θ=0□;

a saturation and hue value conversion step in which the r, θ coordinates are converted to saturation and hue values by projecting the RGB coordinates of the three primary colors RED, GREEN, and BLUE onto said plane, determining the r, θ coordinates of the projected points of the three primary colors, determining scaling factors for the respective primary colors and an offset for one primary color such as will provide a correlation of the r, θ coordinates of the primary colors with the known saturation and hue values for the primary colors, and applying said scaling factors and offset to the r, θ coordinates of the projected image pixel points to obtain the correct saturation and hue values, respectively, of the projected image pixel points, a non-highlight value coordinate determination step, in which the value coordinate V of each valid pixel is determined, and a true RGB coordinate estimation step, in which the true RGB coordinates of each pixel are estimated from said S, H, and V values of each valid pixel.

26. A computer-readable recording medium according to claim 25, wherein in said non-highlight value coordinate determination step, the value coordinate V of each valid pixel is estimated by using the following equation if the hue value H of a pixel is such that H<60.0 or H≧300.0 and the red (R) value of the pixel is less than a maximum non-highlight red value (R_Max);

$V=R$ using the following equation if said hue value H is such that H<60.0 or H≧300.0 and the red (R) value of the pixel is not less than said maximum non-highlight red value;

$V=R\_Max$ using the following equation if said hue value H is such that 60.0≦H<180.0 and the green (G) value of the pixel is less than a maximum non-highlight green value (G_Max);

$V=G$ using the following equation if said hue value H is such that 60.0≦H<180.0 and the green (G) value of the pixel is not less than said maximum non-highlight green value;

$V=G\_Max$ using the following equation if said hue value H is such that 180.0≦H<300.0 and the blue (B) value of the pixel is less than a maximum non-highlight blue value (B_Max);

$V=B$ or using the following equation if said hue value H is such that 180.0≦H<300.0 and the blue (B) value of the pixel is not less than a maximum non-highlight blue value (B_Max):

$V=B\_Max.$

27. A computer-readable recording medium according to claim 26 wherein in said non-highlight value coordinate determination step, each valid pixel is distinguished as being a colored pixel or a monochromatic pixel based on the criterion that the saturation (S) value of a colored pixel is less than a threshold value and said non-highlight value coordinate determination step contains a maximum non-highlight value determination step, in which R_Max, G_Max, and B_Max are set follows in the case of a monochromatic pixel;

$R\_Max=R_W$ $G\_Max=G_W$ $B\_Max=B_W$ where $R_W$ is the R value of the image of a white diffuser, $G_W$ is the G value of said white diffuser image, and $B_W$ is the B value of said white diffuser image, and R_Max, G_Max, and B_Max are set as follows in the case of a colored pixel:

$R\_Max=R_W\times\square 1$ $G\_Max=G_W\times\square 2$ $B\_Max=B_W\times\square 3$ where □1, □2, and □3 are the ratios of the reflectivity values of red, green and blue diffusers, respectively, with respect to the reflectivity value of said white diffuser.

28. A computer-readable recording medium according to claim 26 wherein in said non-highlight value coordinate determination step, each valid pixel is distinguished as being a colored pixel or a monochromatic pixel based on the criterion that the saturation (S) value of a colored pixel is less than a threshold value and said non-highlight value coordinate determination step contains a maximum non-highlight value determination step, in which R_Max, G_Max, and B_Max are set follows in the case of a monochromatic pixel;

$R\_Max=R_W$ $G\_Max=G_W$ $B\_Max=B_W$ where $R_W$ is the R value of the image of a white diffuser, $G_W$ is the G value of said white diffuser image, and $B_W$ is the B value of said white diffuser image, and R_Max, G_Max, and B_Max as follows in the case of a colored pixel:

$R\_Max=R_R$ $G\_Max=G_G$ $B\_Max=B_B$ where $R_R$ is the R value of the image of a red diffuser, $G_G$ is the G value of the image of a green diffuser, and $B_B$ is the B value of the image of a blue diffuser.

29. A computer-readable recording medium according to claim 27 or 28, wherein in said value coordinate determination step, said threshold value is set to 25% of the full scale of the color imaging device.

30. A computer-readable recording medium according to any of claims 25 through 28, wherein in said true RGB coordinate estimation step, the true RGB coordinates of each colored pixel are estimated from the S, H, and V values by an HSV-RGB transformation method, the true RGB coordinates of each monochromatic pixel are estimated using the following relationship, $R=G=B=V$ and the true RGB coordinates of each non-valid pixel are estimated using an association with the colors of neighboring non-highlighted pixels.

31. A computer-readable recording medium according to any of claims 25 through 28, wherein in said true RGB coordinate estimation step, the true RGB coordinates of each colored pixel are estimated from the S, H, and V values by an HSV-RGB transformation method, the true RGB coordinates of each monochromatic pixel are estimated using the following relationship,

R=G=B=V and the true RGB coordinates of each non-valid pixel are estimated using an association with the color of a nearest neighboring non-highlighted pixel with respect to the non-valid pixel.

32. A computer-readable recording medium program according to any of claims 25 through 28, wherein in said true RGB coordinate estimation step, the true RGB coordinates of each colored pixel are estimated from the S, H, and V values by an HSV-RGB transformation method, the true RGB coordinates of each monochromatic pixel are estimated using the following relationship,

R=G=B=V and the true RGB coordinates of each non-valid pixel are estimated as being equal to the RGB coordinates of a nearest neighboring non-highlighted pixel with respect to the non-valid pixel.

33. A computer-readable recording medium according to any of claims 25 through 28, wherein in said true RGB coordinate estimation step, the true RGB coordinates of each colored pixel are estimated from the S, H, and V values by an HSV-RGB transformation method, the true RGB coordinates of each monochromatic pixel are estimated using the following relationship,

R=G=B=V and the true RGB coordinates of each non-valid pixel are estimated using an association with the colors of neighboring non-highlighted pixels, said nearest neighboring non-highlighted pixel with respect to the non-valid pixel being the non-highlighted pixel that has been processed most recently prior to the processing of the non-valid pixel in said true RGB coordinate estimation step.

34. A computer-readable recording medium according to any of claims 25 through 28, wherein in said pixel validity evaluation step, said validity of each pixel is evaluated based on the criterion that none of the three RGB coordinates of a valid pixel exceed 98% of the full scale range of the color imaging device.

35. A computer-readable recording medium according to any of claims 25 through 28, wherein the computer program causes a computer to further execute an estimated true RGB coordinate set synthesizing step, in which a plurality of sets of estimated RGB coordinates of objects are synthesized to form a synthesized set of estimated true RGB coordinates consisting only of estimated true RGB coordinates obtained from valid pixels.

36. A computer-readable recording medium according to any of claims 25 through 28, wherein the computer program causes a computer to further execute a highlighted image pixel identification step, in which the highlighted image pixels are identified.

37. A computer-readable recording medium according to any of claims 25 through 28, wherein the computer program causes a computer to further execute a highlighted image pixel identification step, in which the highlighted image pixels are identified and in said highlight image pixel identification step, an object image pixel, for which any of the R, G, or B values is greater than the corresponding R, G, or B value of the image of a white diffuser, is identified as being a highlighted pixel.

38. A computer-readable recording medium according to any of claims 25 through 28, wherein the computer program causes a computer to further execute a highlighted image pixel identification step, in which the highlighted image pixels are identified and in said highlight image pixel identification step, an object image pixel, for which the R value is greater than the R value of the image of a red diffuser or the G value is greater than the G value of the image of a green diffuser or the B value is greater than the B value of the image of a blue diffuser, is identified as being a highlighted pixel.

39. An image acquisition system, comprised of a light source;

a color imaging device, for capturing the color of the light of said light source and the reflected light from an object illuminated by said light source;

and a computer, having installed therein the computer-readable recording medium as set forth in any of claims 25 through 28.

40. An image acquisition system, comprised of a light source;

a color imaging device, for capturing the color of the light of said light source and the reflected light from an object illuminated by said light source;

a means for changing the position of said light source, orientation of said light source, position of said object, orientation of said object, or combination of the position of said light source, orientation of said light source, position of said object, and orientation of said object, and a computer, having installed therein a program, which synthesizes images taken under different positions of said light source, orientations of said light source, positions of said object, orientations of said object, or combinations of the position of said light source, orientations of said light source, position of said object, and orientation of said object and provides a synthetic image of the object as an RGB reflectance image of said object, and having installed therein the computer-readable recording medium as set forth in any of claims 25 through 28.

41. An image acquisition system, comprised of a light source;

a color imaging device, for capturing the color of the light of said light source and the reflected light from an object illuminated by said light source;

a means for changing the position of said light source, orientation of said light source, position of said object, orientation of said object, or combination of the position of said light source, orientation of said light source, position of said object, and orientation of said object; and a computer, having installed therein a program, which synthesizes images taken under different positions of said light source, orientations of said light source, positions of said object, orientations of said object, or combinations of the position of said light source, orientations of said light source, position of said object, and orientation of said object and provides a synthetic image of the object as an RGB reflectance image of said object, and having installed therein the computer-readable recording medium as set forth in any of claims 25 through 28; and wherein said means for changing the position of said light source, orientation of said light source, position of said object, orientation of said object, or combination of the position of said light source, orientation of said light source, position of said object, and orientation of said object makes said change in a manner such that the fully saturated pixels of the image of the object prior to said change do not completely overlap with the fully saturated pixels of the image of the object subsequent said change.

42. An image acquisition system, comprised of
a light source;
a color imaging device, for capturing the color of the light of said light source and the reflected light from an object illuminated by said light source;
a means for changing the position of said light source, orientation of said light source, position of said object, orientation of said object, or combination of the position of said light source, orientation of said light source, position of said object, and orientation of said object; and
a computer, having installed therein a program, which synthesizes images taken under different positions of said light source, orientations of said light source, positions of said object, orientations of said object, or combinations of the position of said light source, orientations of said light source, position of said object, and orientation of said object and provides a synthetic image of the object as an RGB reflectance image of said object, and having installed therein the computer-readable recording medium as set forth in any of claims 25 through 28; and
wherein said means for changing the position of said light source, orientation of said light source, position of said object, orientation of said object, or combination of the position of said light source, orientation of said light source, position of said object, and orientation of said object makes said change in a manner such that the highlighted pixels of the image of the object prior to said change do not completely overlap with the highlighted pixels of the image of the object subsequent said change.

43. An image acquisition system, comprised of
a light source or a plurality of light sources, which differ in color, position, orientations, intensity, or combination thereof,
a color imaging device or a plurality of color imaging devices, for capturing the color of the light of the light source and the reflected light from an object illuminated by the light source,
a means for changing the illumination, viewpoint, or combination of illumination and viewpoint of the object,
and a computer, having installed therein the computer-readable recording medium according to any of claims 25 through 28, wherein in said true RGB coordinate estimation step, the true RGB coordinates of each colored pixel are estimated from the S, H, and V values by an HSV-RGB transformation method, the true RGB coordinates of each monochromatic pixel are estimated using the following relationship,

R=G=B=V and the true RGB coordinates of each non-valid pixel are estimated using an association with the color of a nearest neighboring non-highlighted pixel with respect to the non-valid pixel.

44. An image acquisition system, comprised of:
a light source or a plurality of light sources, which differ in color, position, orientations, intensity, or combination thereof;
a color imaging device or a plurality of color imaging devices, for capturing the color of the light of the light source and the reflected light from an object illuminated by the light source;
a means for changing the illumination, viewpoint, or combination of illumination and viewpoint of the object;
and a computer, having installed therein the computer-readable recording medium according to any of claims 25 through 28, wherein in said true RGB coordinate estimation step, the true RGB coordinates of each colored pixel are estimated from the S, H, and V values by an HSV-RGB transformation method,
the true RGB coordinates of each monochromatic pixel are estimated using the following relationship,

R=G=B=V and the true RGB coordinates of each non-valid pixel are estimated using an association with the color of a nearest neighboring non-highlighted pixel with respect to the non-valid pixel; and
wherein said means for changing the illumination, viewpoint, or combination of illumination and viewpoint of the object in a manner such that the fully saturated pixels of the image of the object prior to said change do not completely overlap with the fully saturated pixels of the image of the object subsequent said change.

45. An image acquisition system, comprised of:
a light source or a plurality of light sources, which differ in color, position, orientations, intensity, or combination thereof;
a color imaging device or a plurality of color imaging devices, for capturing the color of the light of the light source and the reflected light from an object illuminated by the light source;
a means for changing the illumination, viewpoint, or combination of illumination and viewpoint of the object; and
a computer, having installed therein the computer-readable recording medium according to any of claims 25 through 28, wherein in said true RGB coordinate estimation step, the true RGB coordinates of each colored pixel are estimated from the S, H, and V values by an HSV-RGB transformation method,
the true RGB coordinates of each monochromatic pixel are estimated using the following relationship,

R=G=B=V and the true RGB coordinates of each non-valid pixel are estimated using an association with the color of a nearest neighboring non-highlighted pixel with respect to the non-valid pixel; and
wherein said means for changing the illumination, viewpoint, or combination of illumination and viewpoint of the object in a manner such that the highlighted pixels of the image of the object prior to said change do not completely overlap with the highlighted pixels of the image of the object subsequent said change.

46. An image acquisition system, comprised of:
a light source or a plurality of light sources, which differ in color, position, orientations, intensity, or combination thereof;

a color imaging device or a plurality of color imaging devices, for capturing the color of the light of the light source and the reflected light from an object illuminated by the light source;

a means for changing the illumination, viewpoint, or combination of illumination and viewpoint of the object; and a computer, having installed therein the computer-readable recording medium according to any of claims 25 through 28, wherein in said true RGB coordinate estimation step, the true RGB coordinates of each colored pixel are estimated from the S, H, and V values by an HSV-RGB transformation method, the true RGB coordinates of each monochromatic pixel are estimated using the following relationship, $$R=G=B=V$$

and the true RGB coordinates of each non-valid pixel are estimated using an association with the color of a nearest neighboring non-highlighted pixel with respect to the non-valid pixel; and wherein said means for changing the illumination, viewpoint, or combination of illumination and viewpoint of the object is a means, which changes the position, orientation, or combination of position and orientation of a single light source.

47. An image acquisition system, comprised of:

a light source or a plurality of light sources, which differ in color, position, orientations, intensity, or combination thereof;

a color imaging device or a plurality of color imaging devices, for capturing the color of the light of the light source and the reflected light from an object illuminated by the light source;

a means for changing the illumination, viewpoint, or combination of illumination and viewpoint of the object; and a computer, having installed therein the computer-readable recording medium according to any of claims 25 through 28, wherein in said true RGB coordinate estimation step, the true RGB coordinates of each colored pixel are estimated from the S, H, and V values by an HSV-RGB transformation method, the true RGB coordinates of each monochromatic pixel are estimated using the following relationship, and $$R=G=B=V$$

the true RGB coordinates of each non-valid pixel are estimated using an association with the color of a nearest neighboring non-highlighted pixel with respect to the non-valid pixel; and wherein said means for changing the illumination, viewpoint, or combination of illumination and viewpoint of the object is a means, which changes the light source that illuminates the object.

48. An image acquisition system, comprised of:

a light source or a plurality of light sources, which differ in color, position, orientations, intensity, or combination thereof;

a color imaging device or a plurality of color imaging devices, for capturing the color of the light of the light source and the reflected light from an object illuminated by the light source;

a means for changing the illumination, viewpoint, or combination of illumination and viewpoint of the object; and a computer, having installed therein the computer-readable recording medium according to any of claims 25 through 28, wherein in said true RGB coordinate estimation step, the true RGB coordinates of each colored pixel are estimated from the S, H, and V values by an HSV-RGB transformation method, the true RGB coordinates of each monochromatic pixel are estimated using the following relationship, $$R=G=B=V$$

and the true RGB coordinates of each non-valid pixel are estimated using an association with the color of a nearest neighboring non-highlighted pixel with respect to the non-valid pixel; and wherein said means for changing the illumination, viewpoint, or combination of illumination and viewpoint of the object is a means, which changes the orientation, position, or combination of orientation and position of the object.

49. An image acquisition system, comprised of:

a light source or a plurality of light sources, which differ in color, position, orientations, intensity, or combination thereof;

a color imaging device or a plurality of color imaging devices, for capturing the color of the light of the light source and the reflected light from an object illuminated by the light source;

a means for changing the illumination, viewpoint, or combination of illumination and viewpoint of the object; and a computer, having installed therein the computer-readable recording medium according to any of claims 25 through 28, wherein in said true RGB coordinate estimation step, the true RGB coordinates of each colored pixel are estimated from the S, H, and V values by an HSV-RGB transformation method, the true RGB coordinates of each monochromatic pixel are estimated using the following relationship, $$R=G=B=V$$

and the true RGB coordinates of each non-valid pixel are estimated using an association with the color of a nearest neighboring non-highlighted pixel with respect to the non-valid pixel; and wherein said means for changing the illumination, viewpoint, or combination of illumination and viewpoint of the object is a means, which changes the position, field of view, or combination of position and field of view of a single color imaging device.

50. An image acquisition system, comprised of:

a light source or a plurality of light sources, which differ in color, position, orientations, intensity, or combination thereof;

a color imaging device or a plurality of color imaging devices, for capturing the color of the light of the light source and the reflected light from an object illuminated by the light source;

a means for changing the illumination, viewpoint, or combination of illumination and viewpoint of the object; and a computer, having installed therein the computer-readable recording medium according to any of claims 25 through 28, wherein in said true RGB coordinate estimation step, the true RGB coordinates of each colored pixel are estimated from the S, H, and V values by an HSV-RGB transformation method, the true RGB coordinates of each monochromatic pixel are estimated using the following relationship, $$R=G=B=V$$

and the true RGB coordinates of each non-valid pixel are estimated using an association with the color of a nearest neighboring non-highlighted pixel with respect to the non-valid pixel; and wherein said means for changing the illumination, viewpoint, or combination of illumination and viewpoint of the object is a means, which changes the color imaging device used to capture the reflected light from an object illuminated by the light source.

* * * * *